US006116505A

United States Patent [19]
Withrow

[11] Patent Number: 6,116,505
[45] Date of Patent: Sep. 12, 2000

[54] FUEL TRANSACTION SYSTEM FOR ENABLING THE PURCHASE OF FUEL AND NON-FUEL ITEMS ON A SINGLE AUTHORIZATION

[75] Inventor: Benjamin S. Withrow, Greensboro, N.C.

[73] Assignee: Gilbarco Inc., Greensboro, N.C.

[21] Appl. No.: 09/119,857

[22] Filed: Jul. 21, 1998

[51] Int. Cl.[7] ...................................................... G06F 7/08
[52] U.S. Cl. .......................... 235/381; 235/375; 235/378; 235/380
[58] Field of Search ..................................... 235/381, 380, 235/378, 383, 385, 451, 472.01, 472.02, 492, 483, 375; 902/26, 27, 39

[56] References Cited

U.S. PATENT DOCUMENTS

| | | | |
|---|---|---|---|
| 3,184,714 | 5/1965 | Brown, Jr. et al. .................. | 235/381 X |
| 3,765,567 | 10/1973 | Maiocco et al. ........................... | 222/30 |
| 3,786,421 | 1/1974 | Wostl et al. .............................. | 235/381 |
| 4,967,366 | 10/1990 | Kaehler ................................ | 235/381 X |
| 5,025,372 | 6/1991 | Burton et al. ............................ | 364/406 |
| 5,047,613 | 9/1991 | Swegen et al. .......................... | 235/379 |
| 5,072,380 | 12/1991 | Randelman et al. ................. | 235/384 X |
| 5,192,854 | 3/1993 | Counts ..................................... | 235/375 |
| 5,310,997 | 5/1994 | Roach et al. ............................. | 235/375 |
| 5,340,969 | 8/1994 | Cox ......................................... | 235/381 |
| 5,493,315 | 2/1996 | Atchley ................................ | 235/381 X |
| 5,504,314 | 4/1996 | Farmont ................................... | 235/384 |
| 5,509,083 | 4/1996 | Abtahi et al. ............................. | 235/380 |
| 5,596,501 | 1/1997 | Comer et al. ........................ | 235/381 X |
| 5,798,931 | 8/1998 | Kaehler ................................ | 364/479.01 |
| 5,895,457 | 4/1999 | Kunowski et al. ...................... | 705/413 |
| 6,032,126 | 2/2000 | Kaehler ..................................... | 705/16 |

*Primary Examiner*—Michael G Lee
*Attorney, Agent, or Firm*—Coats & Bennett, P.L.L.C.

[57] ABSTRACT

A fueling transaction system that holds open a customer account after a pay-at-the-pump transaction is authorized. If the customer wishes to select non-fuel goods and services within the associated convenience store or restaurant, she may do so within a pre-programmed allotment of time. If the customer does not wish to purchase non-fuel items or fails to do so within the system time constraints, the system will simply time-out and close the customer's transaction. The initial customer account information or necessary identification may be provided through the customer's card using the dispenser's card reader or via the customer's transponder in an RFID environment. After the initial pre-authorization, the dispenser provides the customer with a code or other indicia linking a subsequent transaction within a convenience store or restaurant to the authorized fueling transaction. The code may be presented to the customer in any manner, but is preferably provided as a code number or scanable bar code printed by the dispenser printer. The printed code is then tendered by the customer or scanned to effect the purchase of a customer's products and links the purchase amount to the previously authorized card or account. The system contemplated in the present invention may be modified to include a self-service or other substantially dedicated scanning or checkout area to expedite pre-authorized customer transactions.

51 Claims, 23 Drawing Sheets

FUEL TRANSACTION SYSTEM FOR ENABLING THE PURCHASE OF FUEL AND NON-FUEL ITEMS ON A SINGLE AUTHORIZATION

BACKGROUND OF THE INVENTION

The present invention relates to transaction improvements in fueling environments. Fuel environment transaction systems have been implemented for years, and an increasing amount of system control has been integrated into the fuel dispenser. Traditional gasoline pumps and service stations have evolved into elaborate point-of-sale (POS) devices having sophisticated control electronics and user interfaces with large displays and touch-pads or screens. The dispensers include various types of payment means, such as card readers and cash acceptors, to expedite and further enhance fueling transactions. A customer is not limited to the purchase of fuel at the dispenser. More recent dispensers allow the customer to purchase select services, such as car washes, and goods, such as fast food or convenience store products at the dispenser. Once purchased, the customer need only pick up the goods and services at the station store or the outlet of a vending machine. Currently, the items for purchase at the dispenser are limited to those preselected for display at the dispenser and thus significantly limit the customer's ability to order anything the store or restaurant has to offer.

Although providing the consumer with a convenient and expedited alternative to conventional dispensing methods, the "pay-at-the-pump" technology tends to decrease the store owners' profits by reducing the amount of in-store purchases of non-fuel items. These consumers are often impatient, do not carry cash, and avoid purchasing items in the store in order to by-pass waiting in line and having to go through another card authorization and transaction process. Thus, there is a need to encourage pay-at-the-pump customers to purchase non-fuel goods and services in the associated convenience stores and restaurants and allow for the purchase of those items regardless of whether they are offered for purchase at the dispenser.

SUMMARY OF THE INVENTION

The present invention fulfills this need by eliminating the need to reauthorize a card or account during a non-fuel purchase within an associated convenience store or restaurant once a fueling transaction is authorized. By eliminating the need to reauthorize a card or account, the present invention greatly expedites non-fuel purchases and strongly encourages pay-at-the-pump customers to purchase non-fuel goods and services in the convenience store or restaurant.

The present fueling transaction system is a cost-efficient alternative for store owners as it does not require additional hardware in its most basic embodiment. Essentially, the system is configured to hold open a customer account after a pay-at-the-pump transaction is authorized. If the customer wishes to select non-fuel goods and services at the associated convenience store, restaurant, or vending machine, she may do so, preferably within a pre-programmed allotment of time. If the customer does not wish to purchase non-fuel items or fails to do so within the system time constraints, the system may simply time-out and close the customer's transaction.

The initial customer account information or necessary identification may be provided using the customer's card via the dispenser's card reader or via the customer's transponder in an RFID environment. After the initial pre-authorization, the dispenser may provide the customer with a code or other indicia linking a subsequent transaction within a convenience store or restaurant to the authorized fueling transaction. The code may be presented to the customer in any manner, but is preferably provided as a code number or scanable bar code printed by the dispenser's printer. The printed code is then tendered by the customer or scanned to effect the purchase of a customer's products and links the purchase amount to the previously authorized card or account. The system contemplated in the present invention may be modified to include a self-service or other substantially dedicated scanning or checkout area to expedite preauthorized customer transactions. Alternatively, the card or transponder may be used to associate the customer with the earlier authorization without requiring a second and time-consuming authorization. The authentication or correlation process may also require the customer to enter a PIN, speak for a voice match, or supply a physical identifier, such as a fingerprint, or other biometric identifier.

The present invention may also be configured to provide various types of loyalty benefits based on past and/or current transactions. Loyalty benefits will be provided to a customer in order to encourage subsequent return to a particular fueling environment or one of an associated group of environments. The benefit may also encourage the purchase of additional products during the current or a subsequent transaction. A loyalty point may be earned by a customer for each transaction, transaction amount, or type or quantity of a particular product or service. For example, a loyalty point may be earned for each gallon of gas purchased or for a fill-up requiring eight or more gallons of gas. The store operators have tremendous flexibility in determining the various criteria for earning loyalty points. Additionally, the loyalty benefits or points are preferably redeemed by a customer in part, or in whole, on subsequent visits to the same or an associated fueling environment. Redeeming points at a subsequent transaction provides an incentive for a customer to return to environments participating in the benefit program. Although redeeming points on a subsequent purchase is preferred, benefits may be made immediately available based solely on the current transaction. Furthermore, the benefits may be based upon current and prior transactions, and allow for both current and subsequent benefit.

The present invention is easily implemented, and its expedited means for checkout encourages customers paying at the pump to purchase items within the associated convenience store or restaurant. Various methods of advertising or merchandising could be used to increase consumer awareness and provide further incentive for pay-at-the-pump customers. For example, once an authorization is acquired at the dispenser, the customer may be offered a discount on selected products if products are purchased within the convenience store or restaurant. The system contemplated in the present invention will increase checkout efficiency by eliminating many redundant transaction authorizations within the convenience store or restaurant, and may provide the means for a virtually self-serve customer checkout.

BRIEF DESCRIPTION OF THE DRAWINGS

The invention will be better understood after a reading of the Detailed Description of the Preferred Embodiment and a review of the drawings in which.

DETAILED DESCRIPTION OF THE PREFERRED EMBODIMENT

Figure 1:
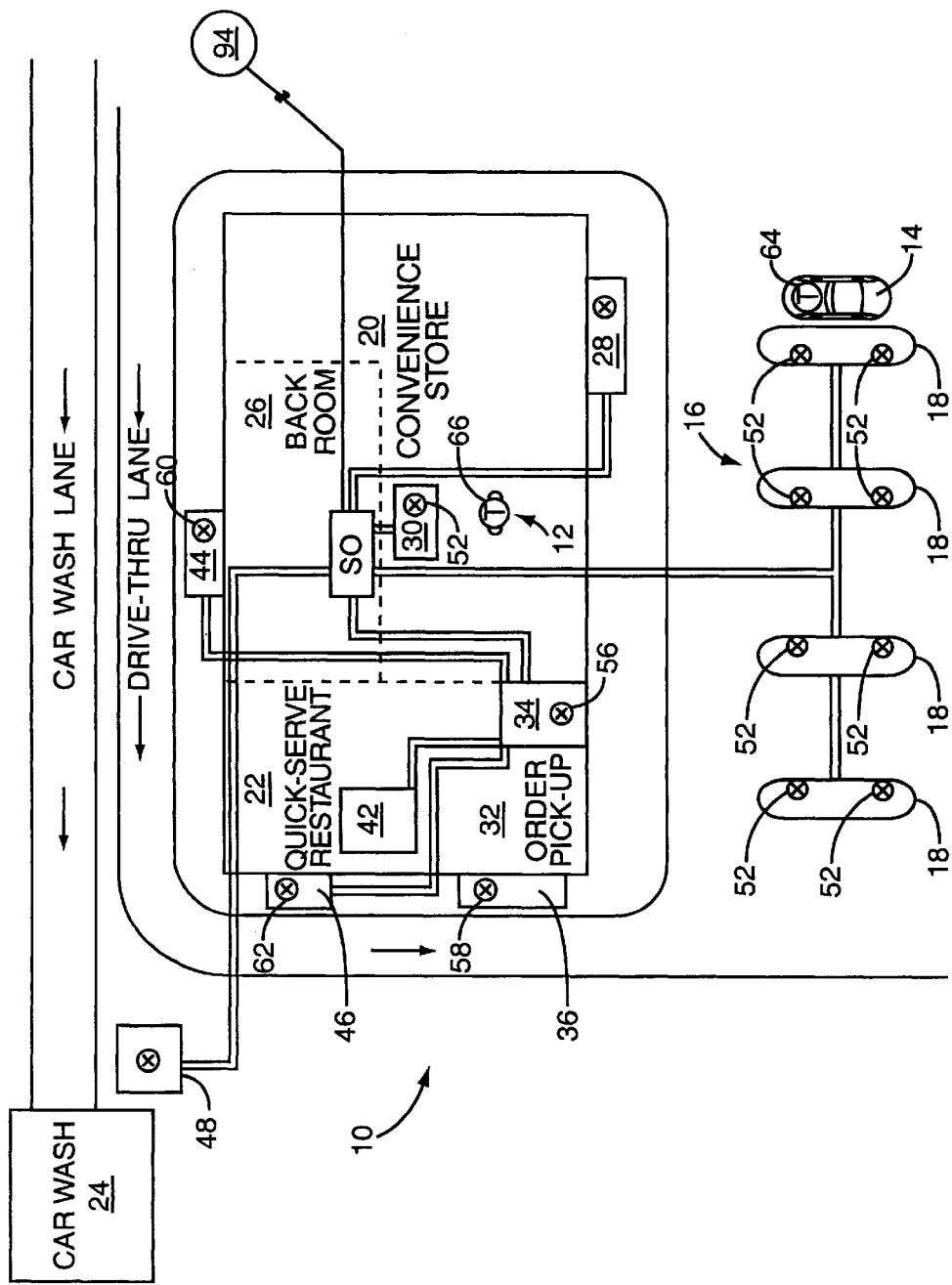
FIG. 1 is a schematic representation of a fueling and retail environment constructed according to the present invention.

In the following description, like reference characters designate like or corresponding parts throughout the several figures. It should be understood that the illustrations are for the purpose of describing preferred embodiments of the invention and are not intended to limit the invention thereto. Given the nature of the present application, an overview of the necessary hardware for the various areas in the fueling environment will be discussed followed by a description of the various functional aspects of the system and how the customer will react and interact with the system during various types of transactions.

As best seen in FIG. 1, a fueling and retail environment, generally designated 10, is shown constructed according to the present invention. The fueling and retail environment provides customers 12 the opportunity to purchase fuel for their vehicles 14 as well as other goods and services, such as fast food and car washes. The fueling and retail environment 10 may include one or more of a forecourt 16, where the fuel dispensers 18 are located, a convenience or fuel station store 20, one or more quick-serve restaurants (QSR) 22, a car wash 24, and a backroom 26. The backroom 26 is generally the central control area for integrating or coordinating control of the dispensers 18, convenience store 20, QSR 22, and car wash 24.

The convenience store 20 typically includes an inventory of a wide assortment of products, ranging from beverages and foods to household goods. The convenience store includes a transaction terminal or register 30, where a customer 12 may purchase convenience store products, fuel, car washes or QSR food.

The QSR 22 generally includes an order pick-up area 32 having a QSR transaction terminal or register 34 located within the convenience store and a drive-thru terminal and window 36. Depending on the application, the QSR transaction terminal 34 and drive-thru terminal 36 may be separated or integrated in any fashion. Usually, customers are able to place orders at the QSR transaction terminal 34 in the store as well as pick up orders in conventional drive-thru style at drive-thru terminal 36.

The QSR 22 may also include a food preparation area 40, a food preparation interface 42 for providing order instruction to QSR food preparers, a drive-thru order placement interface 44 for placing drive-thru orders in a conventional manner, and a customer position monitor 46 for determining the location or position of a customer in line to pick up a QSR order at the drive-thru window 36. Notably, the drive-thru and car wash lanes depicted in FIG. 1 are designed to control the flow of traffic through the respective lanes and aid to ensure vehicles, and their respective transponders, pass by the various interrogation points in the fueling environment as desired.

The car wash 24 includes a car wash interface 48 that interacts with the customer and controls the automatic car wash system (not shown), which may be any suitable automatic car wash. Preferably, a customer 12 will be able to order a car wash at a fuel dispenser 18, at the transaction terminal or register 30 of the convenience store 20, at the QSR transaction terminal 34, or at the car wash interface 48 directly. Similarly, customers are able to order fast-food items from the QSR 22 from various locations in the fueling environment 10, including at the fuel dispensers 18, drive-thru order placement interface 44, and the in-store QSR terminal 34.

Although various overall system and control integration schemes are available, the four major parts of a typical fueling environment 10—forecourt 16, convenience store 20, QSR 22 and car wash 24—typically interface at the backroom 26 using a central control system 50. The central control system 50 may include any number of individual controllers from the various parts of the fueling environment 10 to provide overall system control and integration. The central control system 50 generally interface with the fuel dispensers 18, transaction terminal 30, QSR transaction terminal 34 and the car wash interface 48. Preferably the drive-thru terminal 36, drive-thru order placement interface 44 and customer position monitor 46 directly interface with the drive-thru terminal 36 in order to integrate the QSR functions prior to interfacing with the central control system 50. Additionally, an automated vending system 28 may also interface with the central control system 50 or directly with any one of the other areas of the fueling environment 10, such as the fuel dispensers 18, in order to allow a customer 12 to purchase products from the vending system 28 at a remote location. Those of ordinary skill in the art will recognize several control variations capable of implementing an integrated system.

Many areas within the fueling environment 10 may be equipped with communication electronics capable of providing uni- or bi-directional communications with the customer or vehicle carrying a remote communications device.

The communication electronics will typically include a transmitter for transmitting signals to the remote communications device and a receiver for receiving signals emanating from the remote communications device. The remote communications device may also include a receiver and transmitter. The transmitter and receiver of the remote communications device may separately receive and separately transmit signals in cooperation with an associated control system or may be configured so that the transmitter actually operates on and modifies a signal received from the communication electronics in the fueling environment 10.

For the sake of conciseness and readability, the term "transponder" will be used herein to describe any type of remote communications device capable of communicating with the communication electronics of the fueling environment 10. The remote communications device may include traditional receivers and transmitters alone or in combination as well as traditional transponder electronics adapted to modify an original signal to provide a transmit signal. A transponder as defined herein may provide either unidirectional or bidirectional communications with the communications electronics of the fueling environment 10. Likewise, the communication electronics associated with the various aspects of the fueling environment 10 will be called an "interrogator." An interrogator will generally include a transmitter and receiver capable of communicating with a transponder as defined above. Please note that an interrogator, as defined herein, need not contain both a receiver and a transmitter for various aspects of the invention.

Figure 2A:
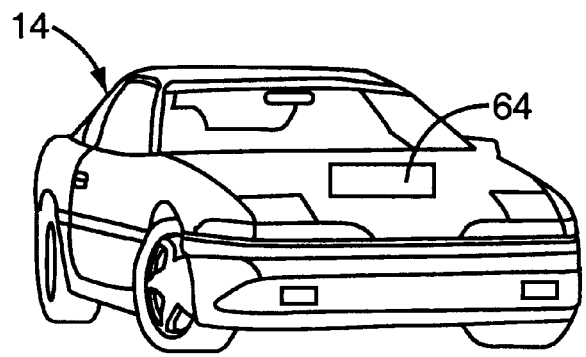
FIG. 2A depicts a vehicle having a vehicle-mounted transponder constructed according to the present invention.
Figure 2B:
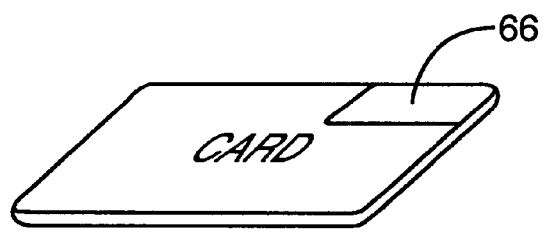
FIG. 2B depicts a personal transponder integrated into a debit/credit or smartcard constructed according to the present invention.
Figure 2C:
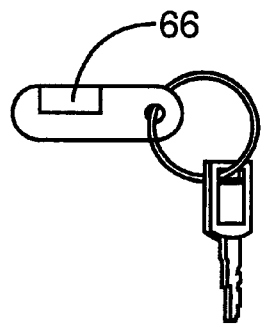
FIG. 2C depicts a personal transponder integrated into key fob constructed according to the present invention.

With the above in mind, the fueling environment 10 may include many interrogators of varying capability. These interrogators may include: dispenser interrogators 52, a store transaction interrogator 54, a QSR transaction interrogator 56, a drive-thru pick-up interrogator 58, a drive-thru order interrogator 60, and a drive-thru position interrogator 62. As shown in FIGS. 2A, 2B and 2C, the dispenser interrogator 52 are preferably adapted to communicate with vehicle-mounted transponders 64 and personal transponder 66. The personal transponder 66 may be mounted on a key fob 68, a wallet card 70, or any other device typically carried by the customer 12, as shown in FIGS. 2B and 2C. FIG. 2A depicts a vehicle 14 having a vehicle-mounted transponder 64.

The levels of sophistication of the vehicle-mounted transponder 64 may vary drastically. The transponder 64 may be integrated with the vehicle's main computer and control system, or may simply be a sticker placed on a window or on another part of the vehicle. The transponder 64 may be active or passive, and may be adapted to either simply send out an identification number or carry out high-level communications and have the ability to process, store and retrieve information.

Figure 3:
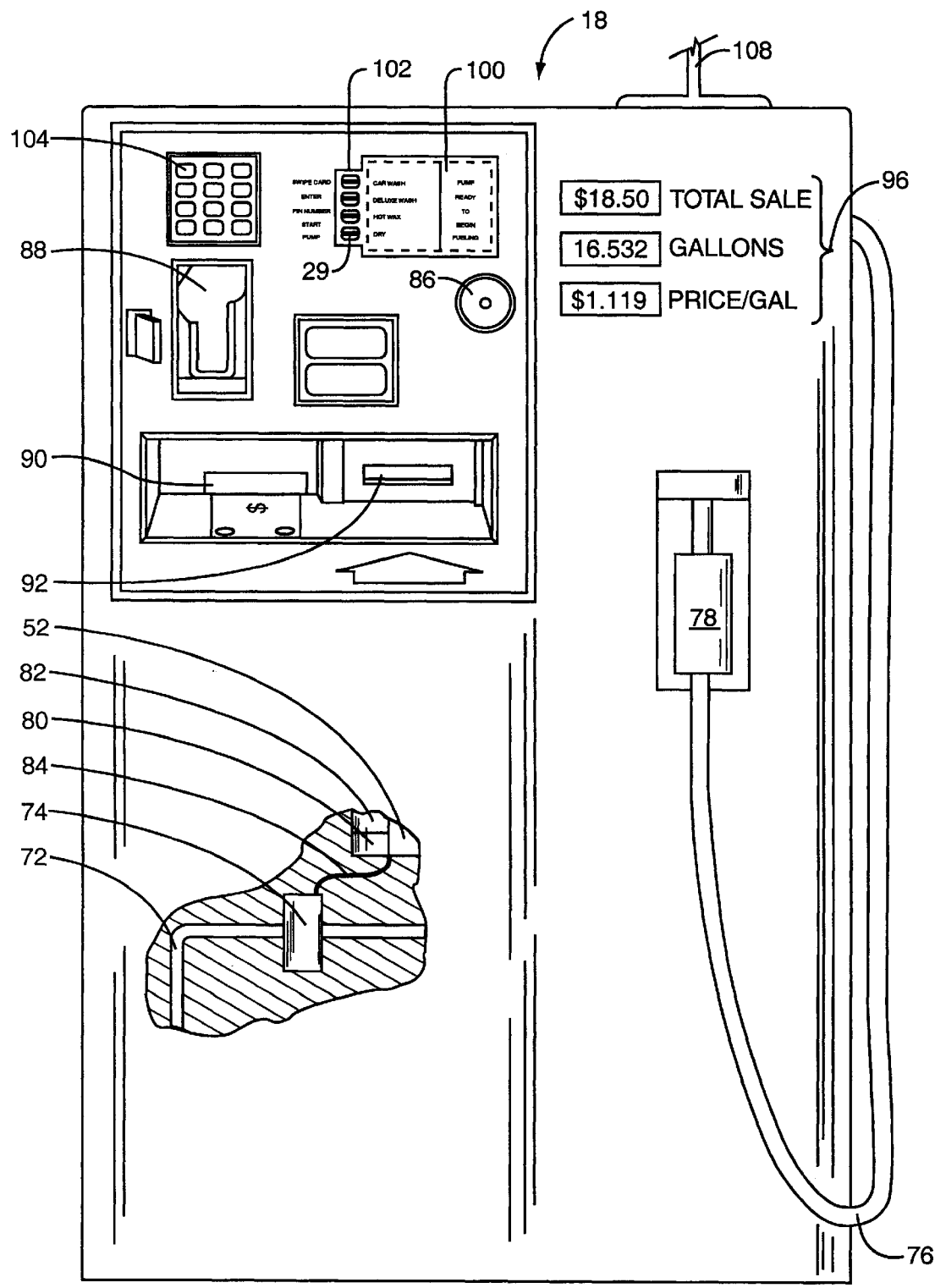
FIG. 3 depicts a fuel dispenser shown constructed according to the present invention.
Figure 4:
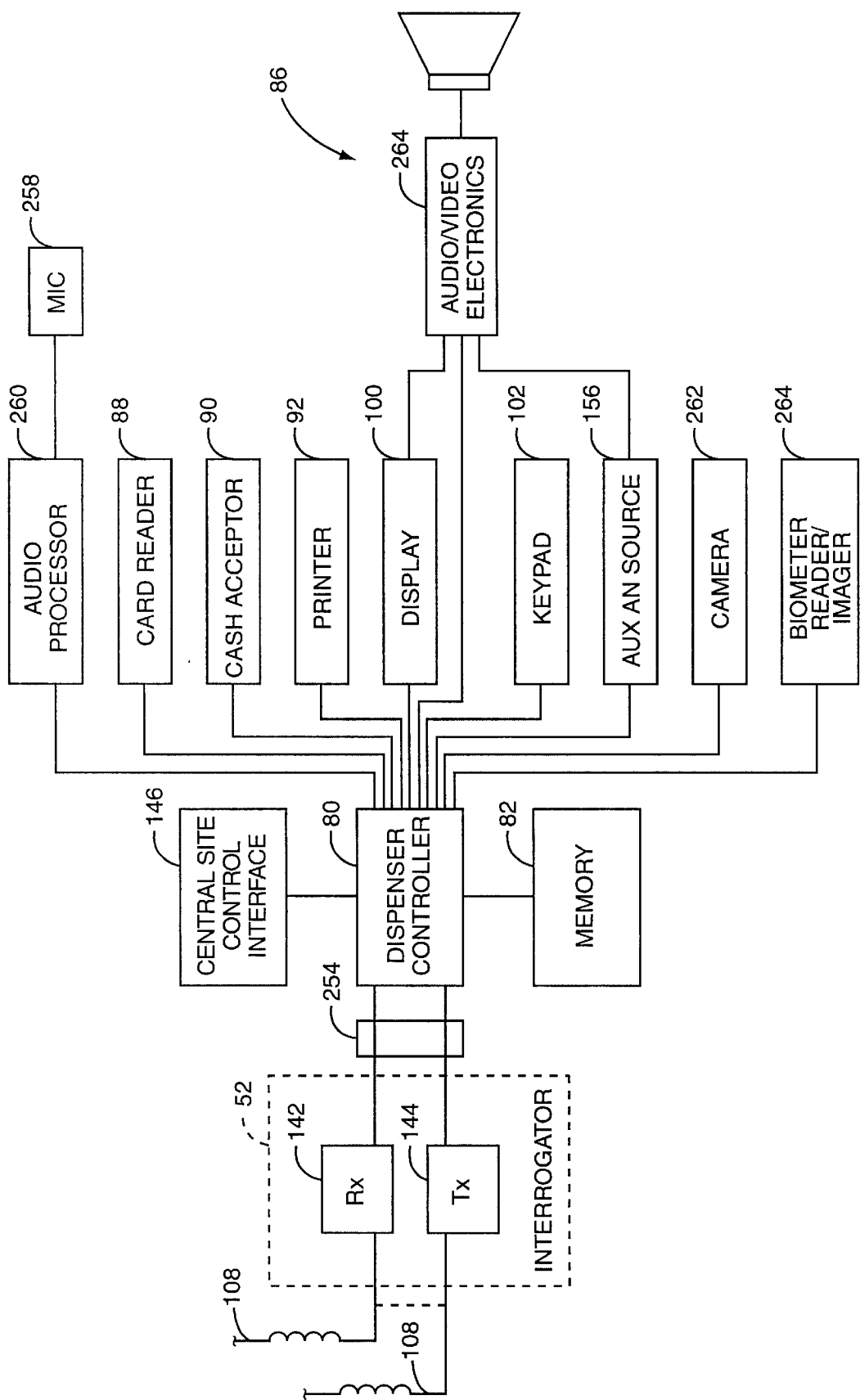
FIG. 4 is a schematic representation of fuel dispenser electronics constructed according to the present invention.

As best seen in FIG. 3, a fuel dispenser 18 is shown constructed according to and as part of the present invention. The dispenser provides a fuel delivery path from an underground storage tank (not shown) to a vehicle 14, (shown in FIGS. 1 and 2A). The delivery path includes a fuel delivery line 72 having a fuel metering device 74. The fuel delivery line 72 communicates with a fuel delivery hose 76 outside of the dispenser 18 and a delivery nozzle 78. The nozzle 78 provides manual control of fuel delivery to the vehicle 14.

The dispenser 18 also includes a dispenser control system 80 having one or more controllers and associated memory 82. The dispenser control system 80 may receive volume data from the metering device 74 through cabling 84 as well as provide control of fuel delivery. The dispenser control system 80 may provide audible signals to an audio module and speaker 86 in order to provide various beeps, tones and audible messages to a customer. These messages may include warnings, instructions and advertising.

The dispenser 18 is preferably equipped with a payment acceptor, such as a card reader 88 or cash acceptor 90, along with a receipt printer 92. With these options, the dispenser control system 80 may read data from the magnetic strip of a card inserted in the card reader 88 or receive cash from a customer and communicate such information to the central control system 50 (as shown in FIG. 1), such as the G-site controller sold by Gilbarco Inc., 7300 West Friendly Avenue, Greensboro, N.C. The central control system 50 typically communicates with a remote network 94, such as a card verification authority, to ascertain whether a transaction proposed to be charged to or debited from an account associated with the card inserted in the card reader 88 is authorized.

The dispenser 18 will include one or more types of displays, preferably one or more alpha-numeric displays 96 together with a high-resolution graphics display 100. The graphics display 100 will generally have an associated key pad 102 adjacent to the display or integrated with the display to provide a touch interface. The dispenser may include an additional, auxiliary key pad 104 associated with the card reader 88 for entering secret codes or personal identification numbers (PIN's). Notably, the displays 96, 100 and key pads 102, 104 may be integrated into a single device and/or touch interface. The dispenser control system 80 is preferably comparable to the microprocessor-based control systems used in CRIND (card reader in dispenser) and TRIND (tag or transponder reader in dispenser) type units sold by Gilbarco Inc. under the trademark THE ADVANTAGE.

As noted, the dispenser control system 80 may include or be associated with dispenser communication electronics referred to as interrogator 52 for providing remote unidirectional or bidirectional communications between a transponder and the dispenser. These transponders may incorporate Texas Instruments' RFID technology; the Micron Microstamp™ produced by Micron Communications, Inc., 8000 South Federal Way, Boise, Id. 83707-0006; or any number of like communication systems. The Micron Microstamp™ engine is an integrated system implementing a communications platform referred to as the Microstamp™ standard on a single CMOS chip. A detailed description of the Microstamp™ engine and the method of communication is provided in its data sheets in the Micron Microstamp™ Standard Programmers Reference Manual provided by Micron Communications, Inc. These references and the information provided by Micron Communications on their web site at http://www.mncc. micron.com are incorporated herein by reference.

Although the preferred communications method includes radio frequencies in the microwave range, these communications may include infrared, acoustic or other known remote communication methods acceptable for use in a fueling environment. Additionally, the dispenser 18 may include one or more antennas 108 associated with the dispenser interrogator 52. Each dispenser may include one interrogator adapted to cover both fueling positions or have one interrogator per fueling position.

The communication system preferably communicates using substantially directional radio frequencies in conjunction with antennas configured to provide precisely shaped and directed interrogation fields. Communications at these frequencies are generally limited to line-of-sight communications wherein arranging the antennas to cover a common interrogation field from different locations avoids parallax and the effect of interference from objects coming between the transponder and one of the antennas. Generally, communications will require the absence of metal objects coming between the antennas and transponders. Thus, when antennas are mounted within the dispenser, glass or plastic dispenser walls are preferable. Furthermore, vehicle-mounted transponders are preferably placed on the windows, behind non-metal portions of the vehicle to avoid interference, or in positions allowing reflections to reach the communication electronics associated with the dispenser.

Preferably, high-gain antennas are used to provide a highly directional and configurable cone shape covering an area most likely to include a transponder when a vehicle is properly positioned for fueling. The antenna range and transmission power is typically adjusted to provide the desired interrogation field while minimizing the potential for the transponder to reflect signals to antennas associated with other fueling positions.

Figure 5:
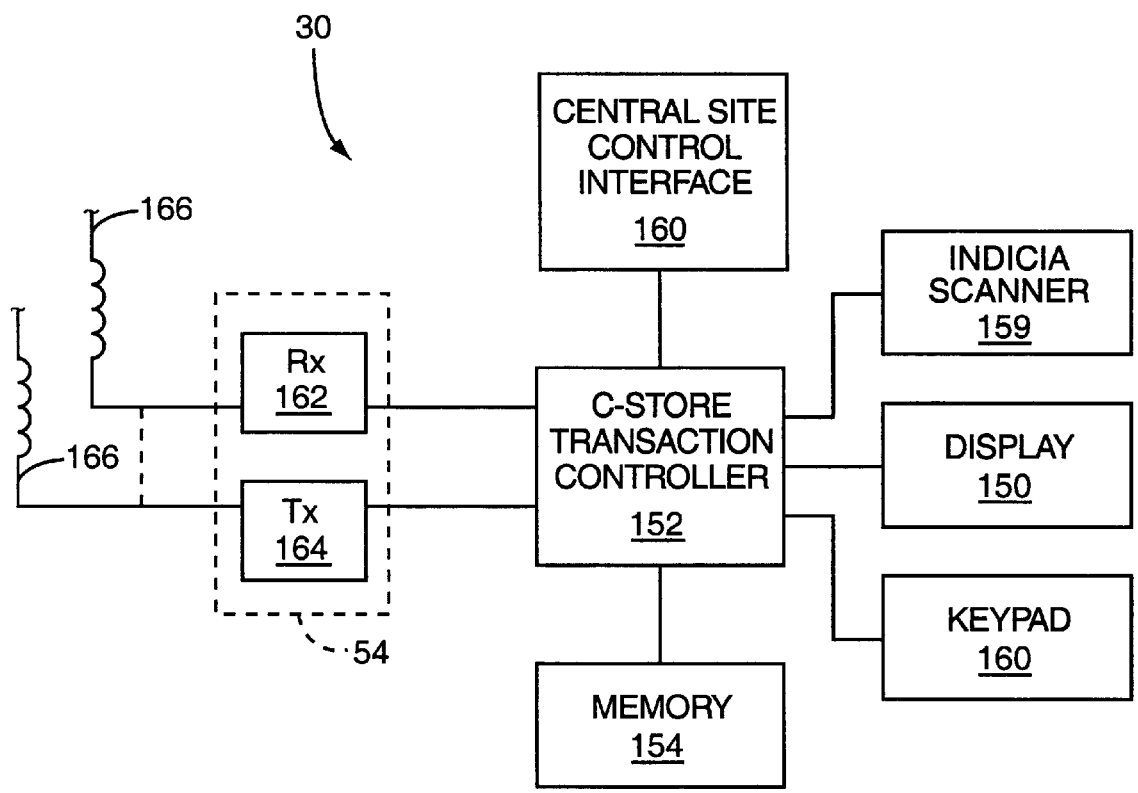
FIG. 5 is a schematic representation of convenience store transaction electronics, including a transaction terminal, for a fueling environment constructed according to the present invention.

FIG. 5 shows a basic schematic overview of the dispenser electronics wherein a dispenser control system 80 includes a controller associated with the memory 82 to interface with the central control system 50 through an interface 146. The dispenser control system 80 provides a graphical user interface with key pad 102 and display 100. Audio/video electronics 86 is adapted to interface with the dispenser control system 80 and/or an auxiliary audio/video source 156 to provide advertising, merchandising and multimedia presentations to a customer in addition to basic transaction functions. The graphical user interface provided by the dispenser allows customers to purchase select goods and services other than fuel at the dispenser. The customer may purchase a car wash and/or order food from the QSR while fueling the vehicle. The customer may be provided a video menu at the display 100 to facilitate selection of the various services, goods and food available for purchase.

Preferably, the customer is provided a message indicating that expedited checkout is available for purchases based on the fueling authorization as described below in detail. The card reader 88 and cash acceptor 90 allow the customer to pay for any of the services, goods or food ordered at the dispenser while the printer 92 will provide a written record of the transaction or indicia to correlate a subsequent purchase with the correct authorization. The dispenser control system 80 is operatively associated with a dispenser interrogator 52, which has a receiver 142 and a transmitter 144. The receiver 142 and transmitter 144 typically associate with one or more antennas 108 to provide remote communications with a transponder. The dispenser control system 80 communicates with the central control system 50 in the backroom 26. Control may be distributed in varying degrees between the dispenser control system 80 and the central control system 50.

In like fashion, the convenience store transaction electronics shown in FIG. 5, and more specifically the transaction terminal register 30, include a store transaction controller 152, associated memory 154, the interrogator 54, and a display and key pad 150, 160 forming a transaction terminal interface. Preferably, a scanner 159, such as a bar code scanner, is provided to read product labels and codes as well as indicia printed at the dispenser to allow a control system to associate a customer and products with a fueling authorization. The transaction controller 152 preferably interacts with the central control system 50 through the central site control interface 160. Again, control may be distributed in varying degrees.

The interrogator 54 includes a receiver 162 and a transmitter 164, both of which are associated with one or more antennas 166. The transaction terminal 30 is adapted to provide typical transaction functions of a cash register and a card authorization terminal in addition to communicating with transponders within the store and/or proximate to the terminal. The communications between the transponder and the store transaction terminal are generally related to transactional and customer identification for authorization correlation, although other features will become apparent to those skilled in the art upon reading this disclosure.

Figure 6:
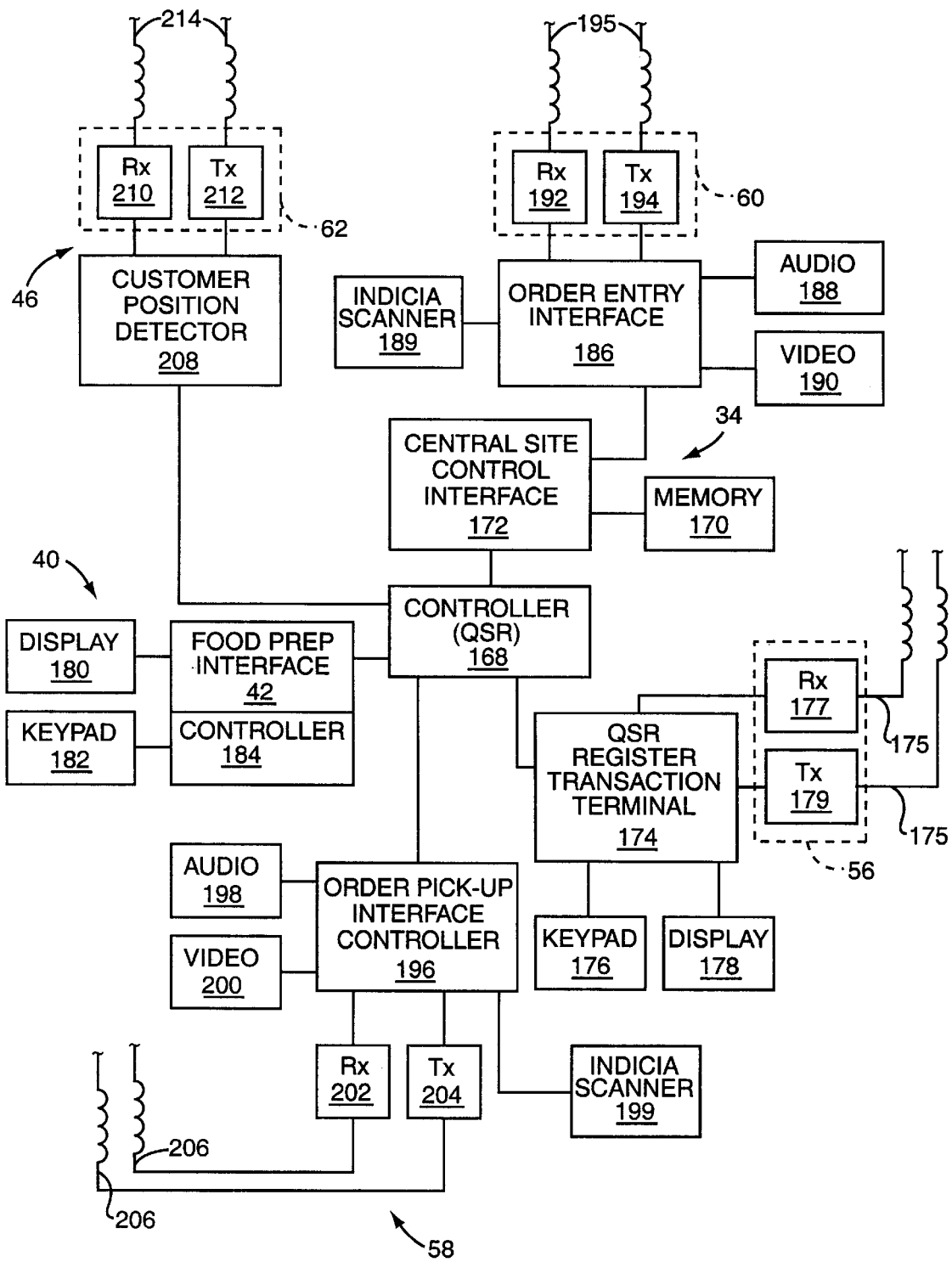
FIG. 6 is a schematic representation of a quick-serve restaurant control system for a fueling environment constructed according to the present invention.

Attention is now drawn to FIG. 6 and the schematic outline of the QSR electronics shown therein. The QSR will generally have a controller 168 and associated memory 170 capable of interfacing with the central control system 50 through a central site control interface 172. As with many QSR's, a transaction terminal or register 174 is provided having a key pad 176 and display 178. The QSR transaction terminal 174 is used by a QSR operator to take customer orders from within the store in conventional fashion. The orders are either verbally or electronically communicated to the food preparation area 40 through the QSR controller 168. The QSR transaction terminal 174 is associated with interrogator 56 having a receiver 177 and a transmitter 179 associated with one or more antennas 175. The food preparation area will typically have a food preparation interface 42 having a display 180 and a key pad 182. The food preparation interface 42 may be a terminal run from the QSR controller 168 or may contain a food preparation controller 184 within the food preparation interface 42. However the system is arranged, order information is passed from one of the order interfaces to the food preparation display 180 to alert food preparers of an order.

In a QSR embodiment providing drive-thru capability, a remote order entry interface 186 is provided. The order entry interface 186 may include a menu board and audio intercom system 188, or in a more sophisticated embodiment, may provide for bi-directional video intercom using the audio intercom 188 and a video system 190 allowing the customer and QSR operator to audibly and visually interact with one another during order placement. The order entry interface 186 may also include an interrogator 60 having a receiver 192 and a transmitter 194, associated with one or more antennas 195, for communicating with a transponder of a customer when the customer is placing an order at the order entry interface 186.

Typically, orders placed at the order entry interface 186 are sent to the order pick-up interface 196, which is normally situated proximate to the pick-up window 36 at the end of the drive-thru lane. The order pick-up interface 196 will have an audio system 198 to provide the audio intercom and an optional video system 200 if video intercom with the order entry interface 186 is desired. The order pick-up interface 196 also has an associated interrogator 58 having a receiver 202 and a transmitter 204 associated with one or more antennas 206. The order entry interference 186 and/or order pickup interface 196 may also include indicia scanners 189,199 adapted to read indicia printed by the dispenser to allow a control system to associate a customer and order with a prior fueling authorization.

Unlike existing QSR's, the present invention may include a customer position detector 208, preferably placed somewhere along the drive-thru lane to detect when a customer is at or is past that position en route to pick up an order, which may have been placed at a fuel dispenser 18. The customer position detector 208 is associated with the drive-thru position interrogator 62 and includes a receiver 210 and a transmitter 212 associated with one or more antennas 214.

Figure 7:
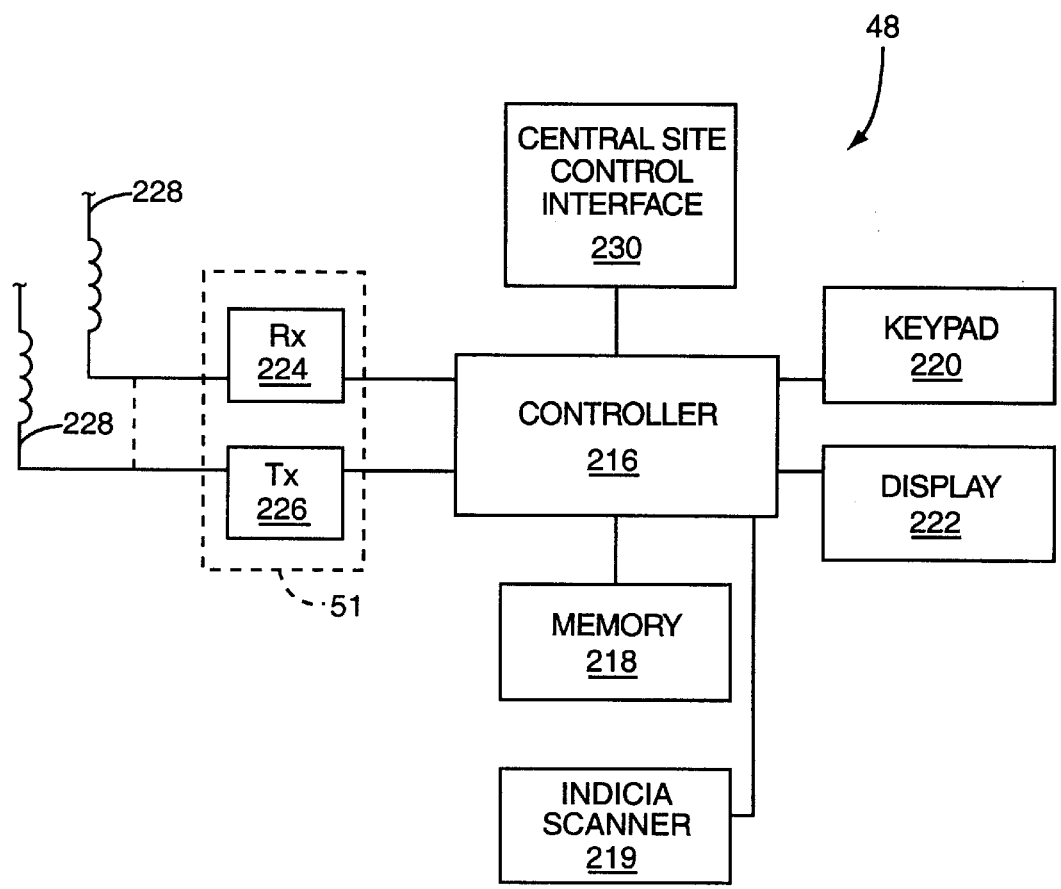
FIG. 7 is a schematic representation of a car wash control system constructed according to the present invention.

FIG. 7 depicts the basic outline of the car wash electronics, which includes a controller 216, memory 218, a key pad 220, a display 222 and the interrogator 51. The key pad 220 and display 222 combine with the controller 216 to provide a customer interface 48. The interrogator 51 includes a receiver 224 and a transmitter 226 associated with one or more antennas 228. An indicia scanner may be provided to receive indicia printed at the dispenser. Additionally, the car wash controller 216 preferably communicates with the central control system 50 in the store via a central site control interface 230. The interrogator 51 may typically communicate with a customer or vehicle transponder to facilitate car wash authorization. The key pad interrogator 51 or indicia scanner 219 may be used to receive a secret code or other information to select a type of wash, authorize the car wash, or associate the customer purchase with a prior fueling authorization.

Figure 8:
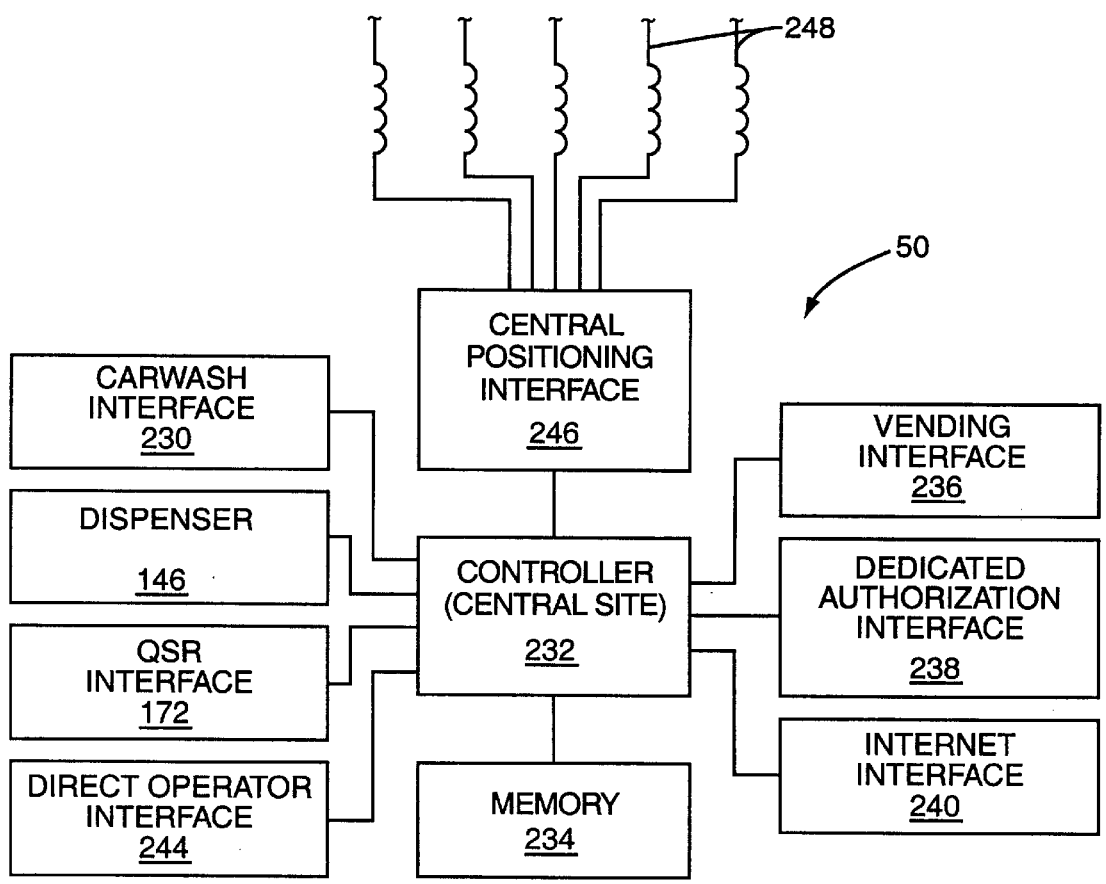
FIG. 8 is a schematic representation of a central control system for a fueling environment constructed according to the present invention.

FIG. 8 generally depicts the central control system 50 found in the backroom 26 of the fueling environment 10. The central control system 50 may include one or more controllers 232 associated with memory 234. The central control system 50 may include multiple interfaces with the various areas in the fueling environment 10. These interfaces include the car wash interface 230, dispenser interface 146, QSR interface 172 and the vending interface 236 connected to an automated vending machine 28. Additionally, the central controller 232 may have a dedicated network or authorization interface 238 connected to a host transaction network 94 for authorizing credit and debit transactions and the like. An Internet interface may also be provided for transactions and other information relating to operation, advertising, merchandising and general inventory and management functions.

The dedicated authorization interface and/or Internet interface may operate on a dedicated service line or a telephone system 242. Furthermore, the central control system 50 may have a direct operator interface 244 associated with the controller 232 to allow an operator to interact with the control system. In more advanced embodiments, a central positioning interface 246 associated with multiple antennas 248 may be used to determine transponder position and location throughout the fueling environment. Those skilled in the art will be aware of a multitude of positioning and locating techniques, such as triangulation, wherein various characteristics of a signal emitted from the transponder are measured and monitored to determine movement as well as precise location. The antennas 248 associated with the central positioning interface 246 may take the place of or act in conjunction with the various antennas throughout the fueling environment to locate and monitor movement of the transponders in the fueling environment.

Figure 9A:
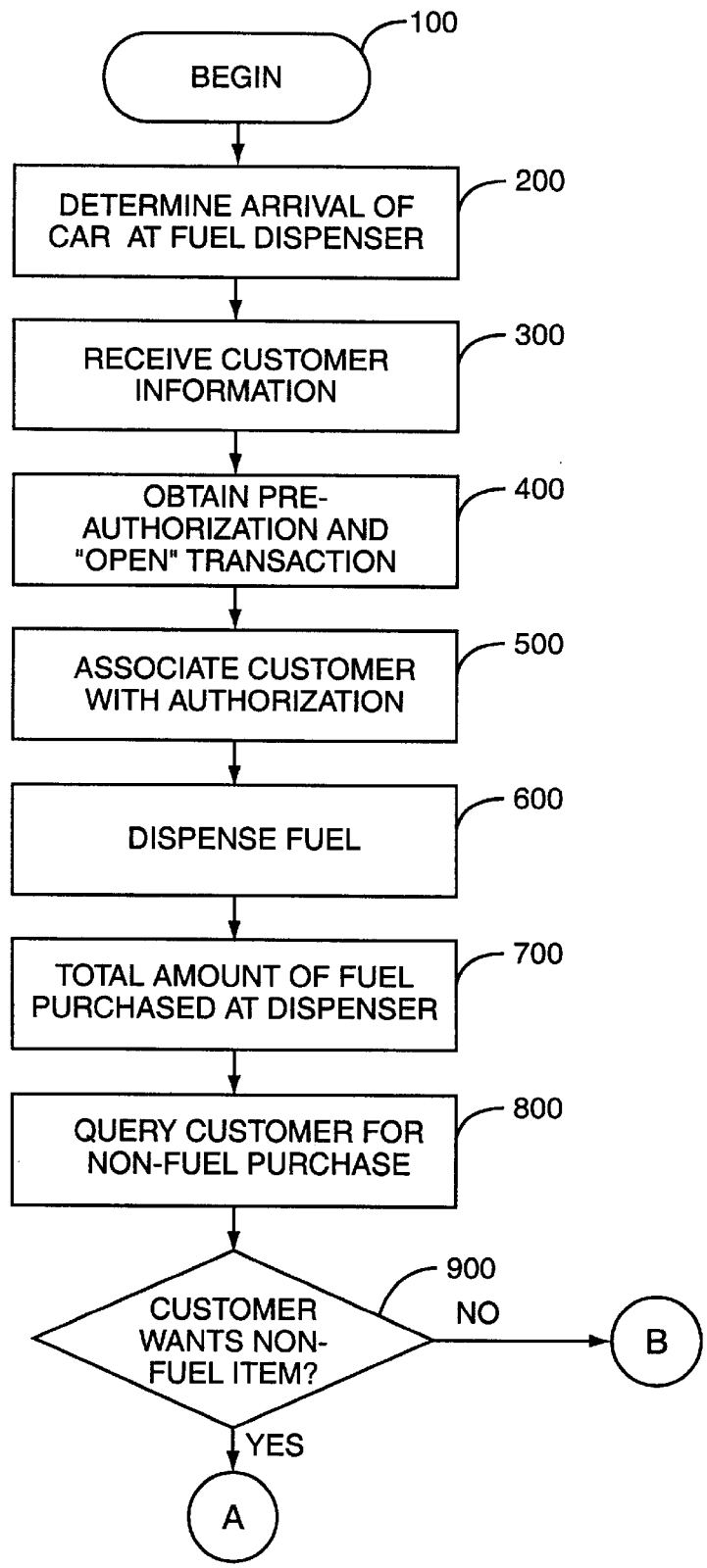
FIGS. 9A and 9B are a flow chart representing the basic process effecting a customer's transaction according to the present invention.
Figure 9B:
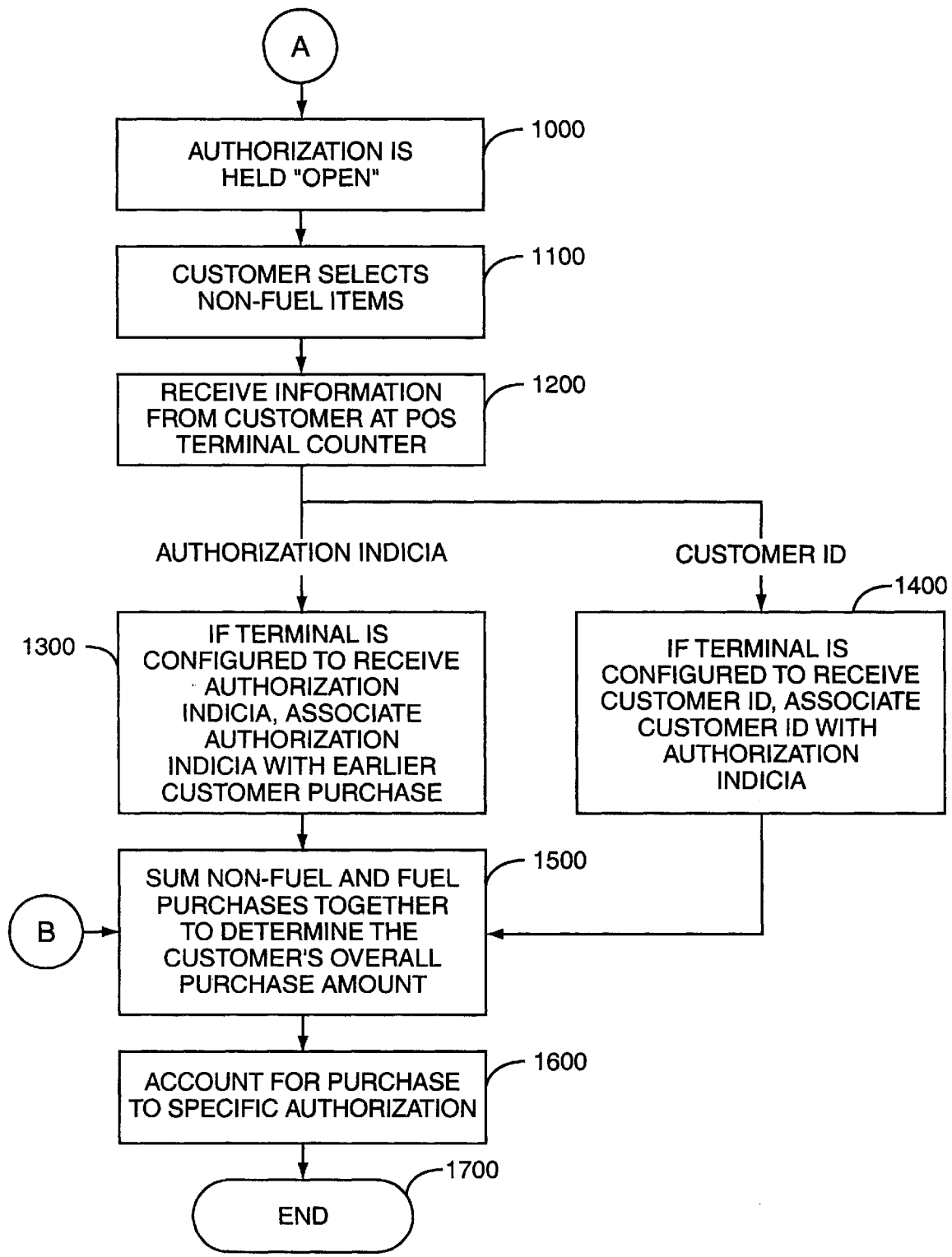
Figure 10A:
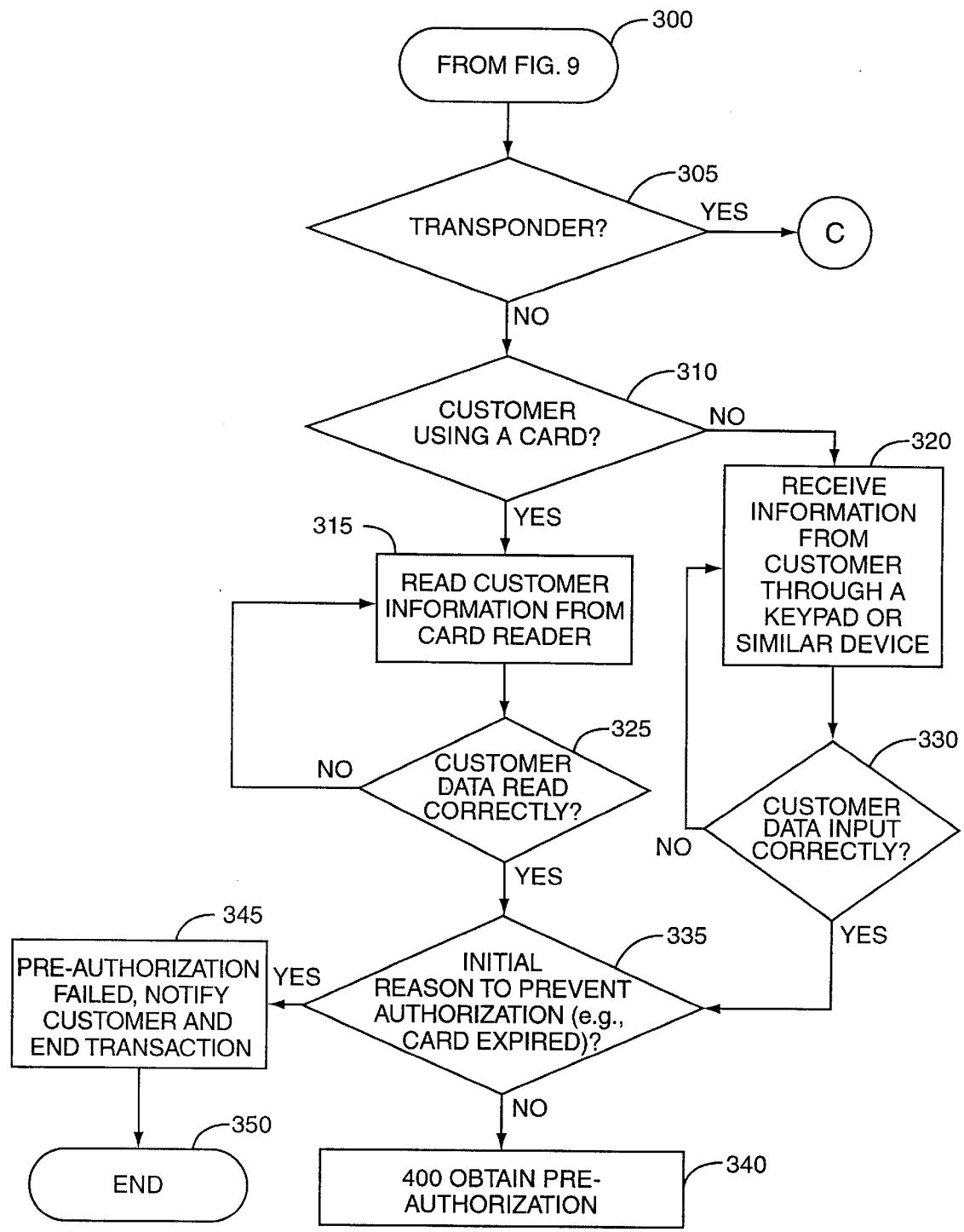
FIGS. 10A and 10B are a flow chart representing the basic process of receiving customer information.
Figure 10B:
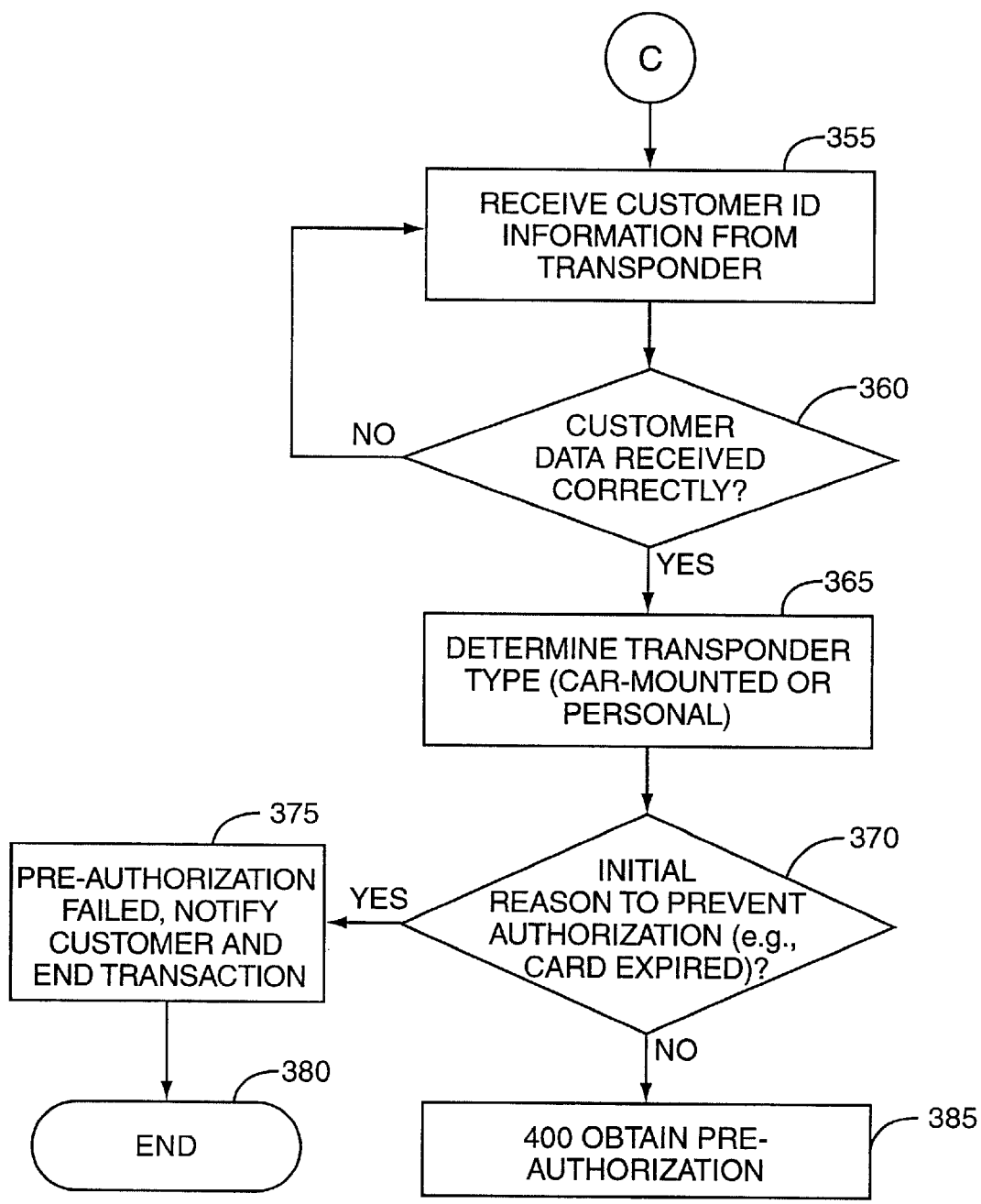

With reference to FIGS. 9A and 9B, the basic operation of the preferred embodiment is shown. Many of the steps shown in FIGS. 9A and 9B are discussed in greater detail in the flow charts of the following figures. The process begins (Block 100) by determining the arrival of the vehicle at the fuel dispenser (Block 200). Arrival of the vehicle may be determined by polling for the presence of a transponder on the vehicle or person or receiving input from the customer at the dispenser. The customer will provide the fuel dispenser directly or indirectly sufficient information to carry out a fueling transaction. Information may simply be a customer ID or actual financial information. When the customer ID is provided, the dispenser, central site control system, or other associated control system or database, may correlate the customer information with a financial account to affect transaction. Once the necessary information for a transaction is obtained, the control system, preferably the central site controller, will contact a remote host to obtain pre-authorization and open an account for a transaction (Block 400). Once pre-authorization is obtained, the control system or host will associate the customer with the authorization obtained in a manner sufficient to allow the customer to purchase fuel based on that authorization (Block 500). The control system will allow the dispensing of fuel (Block 600) and total the amount of fuel delivered by the dispenser (Block 700). At some point during the fueling operation, the dispenser will query the customer or provide the customer the opportunity to purchase non-fuel items from an associated convenience store, restaurant or vending machine (Block 800). Notably, the customer does not have to select the items to be purchased at the dispenser; the only decision necessary is that the customer wants to purchase items away from the fuel dispenser such as in the convenience store or QSR. Furthermore, the term "non-fuel purchase" is used to help distinguish between purchases made at the fuel dispenser and those made apart from the fuel dispenser.

If the customer elects to purchase non-fuel items apart from the dispenser (Block 900), the opened authorization is maintained to allow items selected apart from the dispenser to be charged or credited to the authorized account (Block 100). Accordingly, the customer will select the non-fuel items (Block 1100) and provide information to a remote POS terminal in order to allow the control system to correlate the customer in the store with the appropriate authorization (Block 1200).

As noted, the information provided by the customer to the remote terminal may be information received from the fuel dispenser relating to the obtained authorization or some type of identification indicia substantially permanently held by the customer. In the latter case, the identification indicia may be the customer or financial information, stored on a transponder or card held by the customer. The supplied information may also be biometric indicia relating to a physical characteristic of the customer, or basically any type of customer provided information capable of associating customer purchases at a dispenser and at a remote POS terminal with an authorization.

Thus, if authorization is provided to the customer by the dispenser, the control system will associate the received authorization indicia with a subsequent purchase by that customer at the remote POS terminal (Block 1300). If the system configuration is such that the customer provides constantly held information at the dispenser and at the POS terminal (i.e., the dispenser does not give the customer information for presentation of the POS), the control system will associate information received by the customer at the POS terminal with the authorization obtained by that customer from the dispenser (Block 1400). At this point, the control system will total purchases at the dispenser with those made at the remote POS terminal (Block 1500) and account for the purchases for the given authorization (Block 1600) and the process ends (Block 1700).

It is important to realize that control for the system may involve POS controllers, central site controllers, dispenser controllers, and others necessary to effect purchase of goods, obtain authorizations and interact with the customers. This control may be distributed in varying degrees throughout the various systems as those skilled in the art are aware. Furthermore, the manner in which information is provided to the dispenser and a remote POS may vary significantly as those skilled in the art will appreciate. The important aspect of the invention is that information is received by the customer in some manner to obtain authorization for a purchase at a dispenser location, wherein the authorization is held open for additional purchases made at a location apart from the dispenser to avoid a subsequent authorization. The information may be provided to the dispenser or POS terminal via a card, transponder, biometric input, indicia scanner, or keyboard. Those skilled in the art will recognize other means to provide information to the dispenser and remote POS that are within the spirit of the present invention and the claims that follow.

With reference to FIGS. 10A–16B, a more detailed overview of certain steps of the process is shown in FIGS. 9A and 9B. As noted, at this point, the process begins (Block 100) by determining the arrival of the car (Block 200). This may be determined by having the dispenser periodically poll for a transponder and await receipt of a transponder response or simply wait for a physical interaction by the customer. The dispenser is then prepared to receive identifying information and/or financial information from the customer (Block 300) to enable the ensuing transaction (detail in FIGS. 10A and 10B). If the customer is not using a transponder to identify herself (Block 305), and is not using a card (Block 310), then the dispenser receives identifying information from the customer through a keypad or similar device such as a biometric scanner (Block 320). If the customer inputs the data correctly (Block 330) the control system determines if there is an initial reason to prevent authorization (Block 335). If there is no initial reason to deny authorization (Block 335), the control system will attempt to obtain pre-authorization (Block 340). If there is an initial reason to deny authorization (Block 335), the dispenser notifies the customer that the request for pre-authorization failed (Block 345) and ends the transaction (Block 350).

If the customer is not using a transponder to identify herself (Block 305), but is using a magnetic card (Block 310), the control system reads the customer's identifying information from a card reader (Block 315). If the customer's identifying information is correctly read (Block 325), the control system determines if there is an initial reason to prevent authorization, e.g. card expired (Block 335). If there is no initial reason to deny authorization (Block 335), the control system will attempt to obtain pre-authorization (Block 340). If there is an initial reason to deny authorization (Block 335), the dispenser notifies the customer that the request for pre-authorization failed (Block 345) and ends the transaction (Block 350).

If the customer is using a personal or car-mounted transponder to identify herself (Block 305), the control system receives the customer identifying information and/or financial information from the transponder (Block 355). If the identifying information if correctly received (Block 360), the control system determines the transponder type, car-mounted or personal (Block 365). After determining the transponder type (Block 365), the control system determines if there is an initial reason to prevent authorization, e.g. account expired (Block 370). If there is no initial reason to prevent authorization (Block 370), the control system attempts to obtain pre-authorization (Block 385). If there is an initial reason to prevent authorization (Block 370), the customer is notified of the rejection (Block 375) and the transaction is ended (Block 380).

Figure 11:
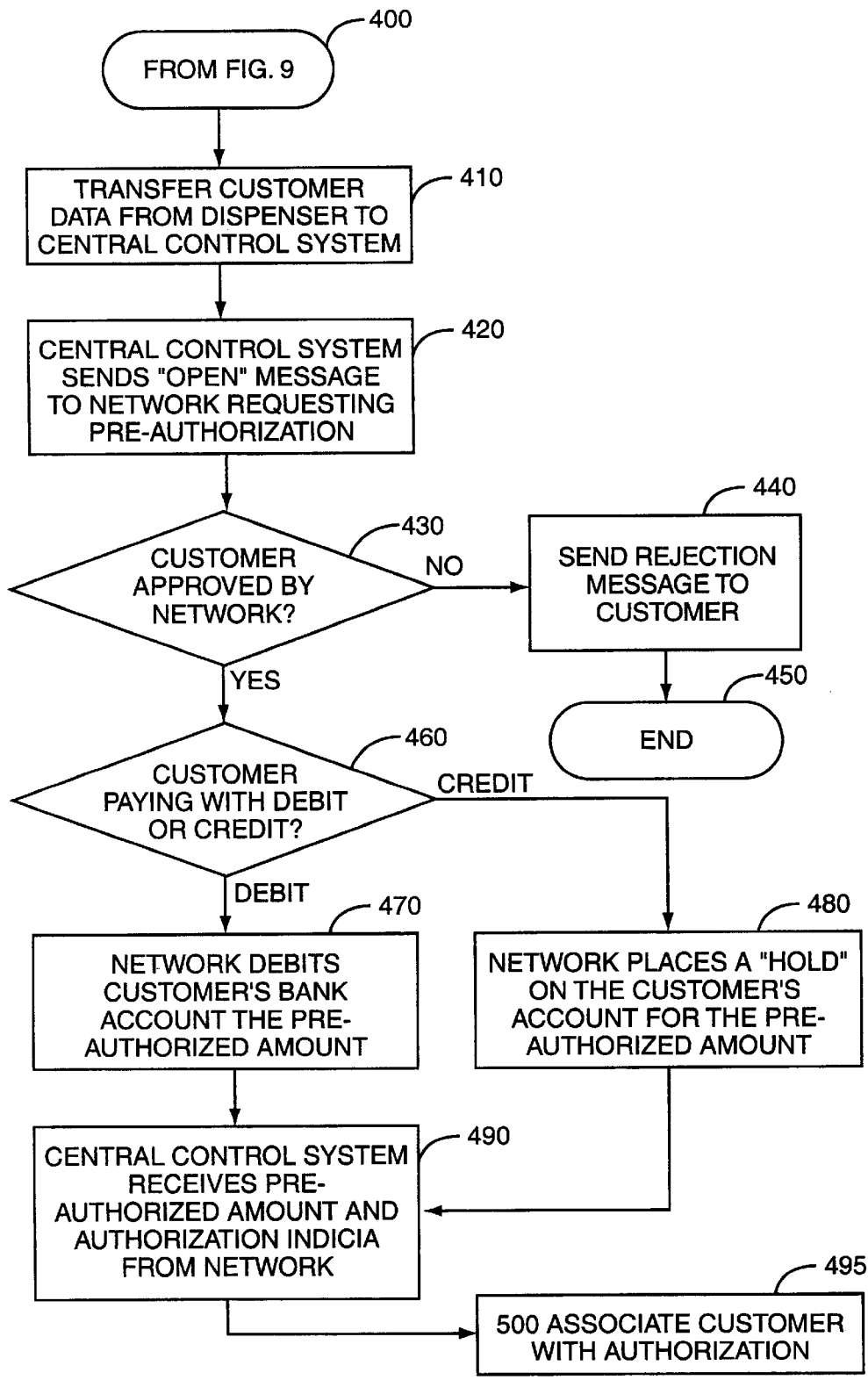
FIG. 11 is a flow chart representing basic pre-authorization.

After receiving the customer identifying information (Block 300), the control system attempts to obtain pre-authorization from the network and open the customer's transaction (Block 400) (see FIG. 11). The customer identifying information and/or account information is transferred from the control system in the dispenser to the central control system (Block 410). The central control system then sends an "open" message to the network requesting pre-authorization. If the network refuses to open a transaction for the given customer (Block 430), the control system notifies the customer of the rejection (Block 440) and the transaction is ended (Block 450).

If the network approves the customer's transaction (Block 430), the network may determine if the customer is attempting to pay with credit or debit (Block 460). If the network determines that the customer is attempting to pay with credit (Block 460), the network places a "hold" on the customer's account for the pre-authorized amount, which is typically $50. If the network determines that the customer is paying with debit (Block 460), the network debits the customer's bank account the pre-authorized amount (Block 470). After the network either "holds" or debits the customer's account, the network sends to the central control system the amount held or debited from the customer's account, and/or authorization indicia, typically an authorization number, specific to a given customer (Block 490). The pre-authorization is concluded by associating the given authorization indicia, or rejection, with the appropriate customer (Block 495), if necessary.

Figure 12:
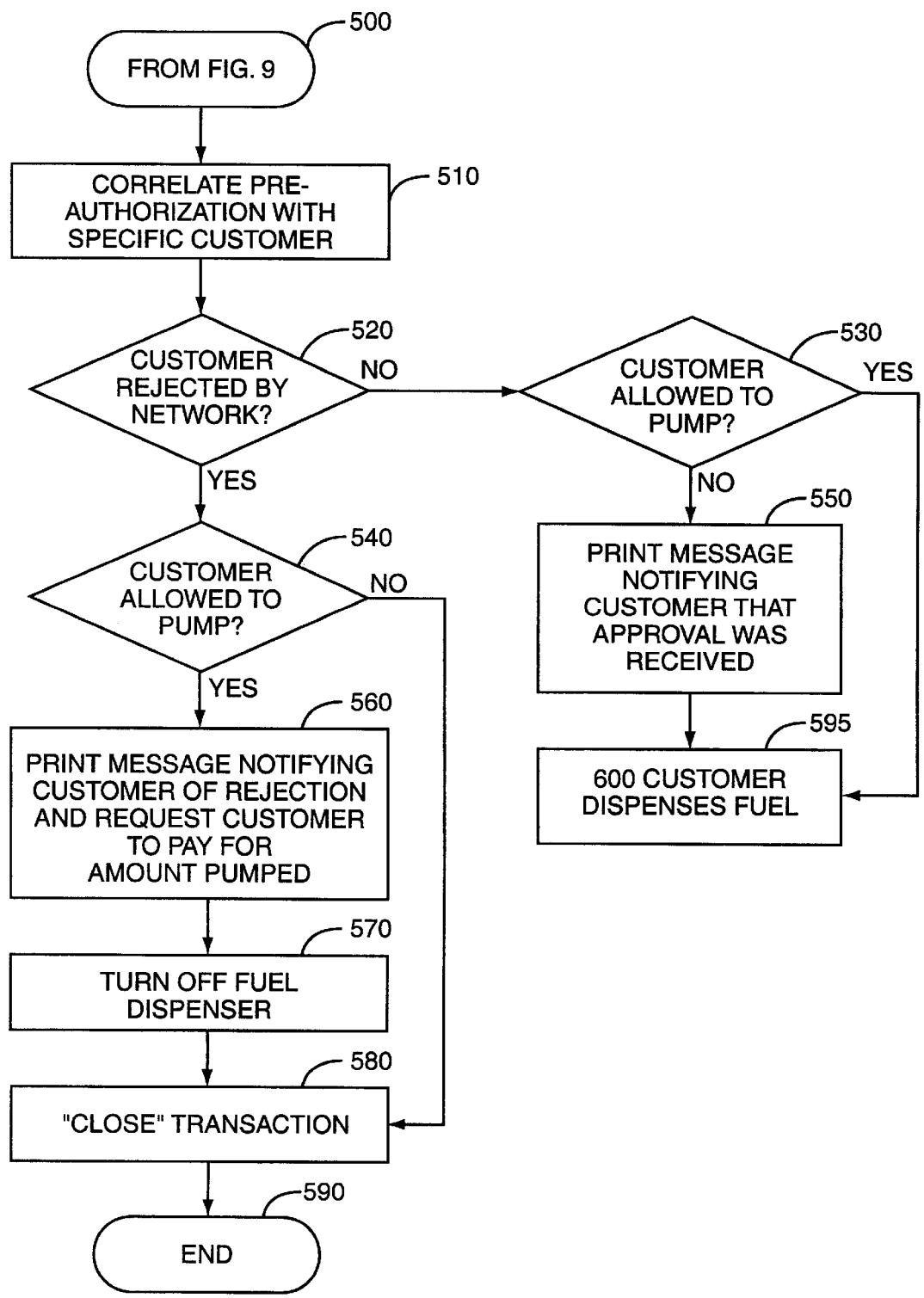
FIG. 12 is a flow chart representing basic association of pre-authorization with a specific customer.

As shown in FIG. 12, associating a specific customer with a given authorization indicia is begun (Block 500) by first correlating the received pre-authorization code with the appropriate customer (Block 510). If the customer was not rejected by the network (Block 520) and the customer was not allowed to pump gasoline before the control system received the pre-authorization from the network (Block 530), the dispenser notifies the customer that approval was received (Block 550) and that she may begin to dispense fuel (Block 595). If the customer was not rejected by the network (Block 520) and the customer was allowed to pump gasoline before the control system received pre-authorization (Block 530), no such customer notification is necessary as the customer is simply allowed to continue dispensing fuel (Block 595).

If the customer is rejected by the network (Block 520) and the customer was not allowed to dispense fuel prior to being pre-authorized by the network (Block 540), the transaction is "closed" (Block 580) and ended (Block 590). If, however, the customer was rejected (Block 520) and allowed to pump prior to being pre-authorized by the network (Block 540), the dispenser notifies the customer of the network rejection and requests the customer to pay for the amount already dispensed (Block 560). The control system then turns off the fuel dispenser (570) before "closing" (Block 580) and ending the transaction (Block 590).

Figure 13A:
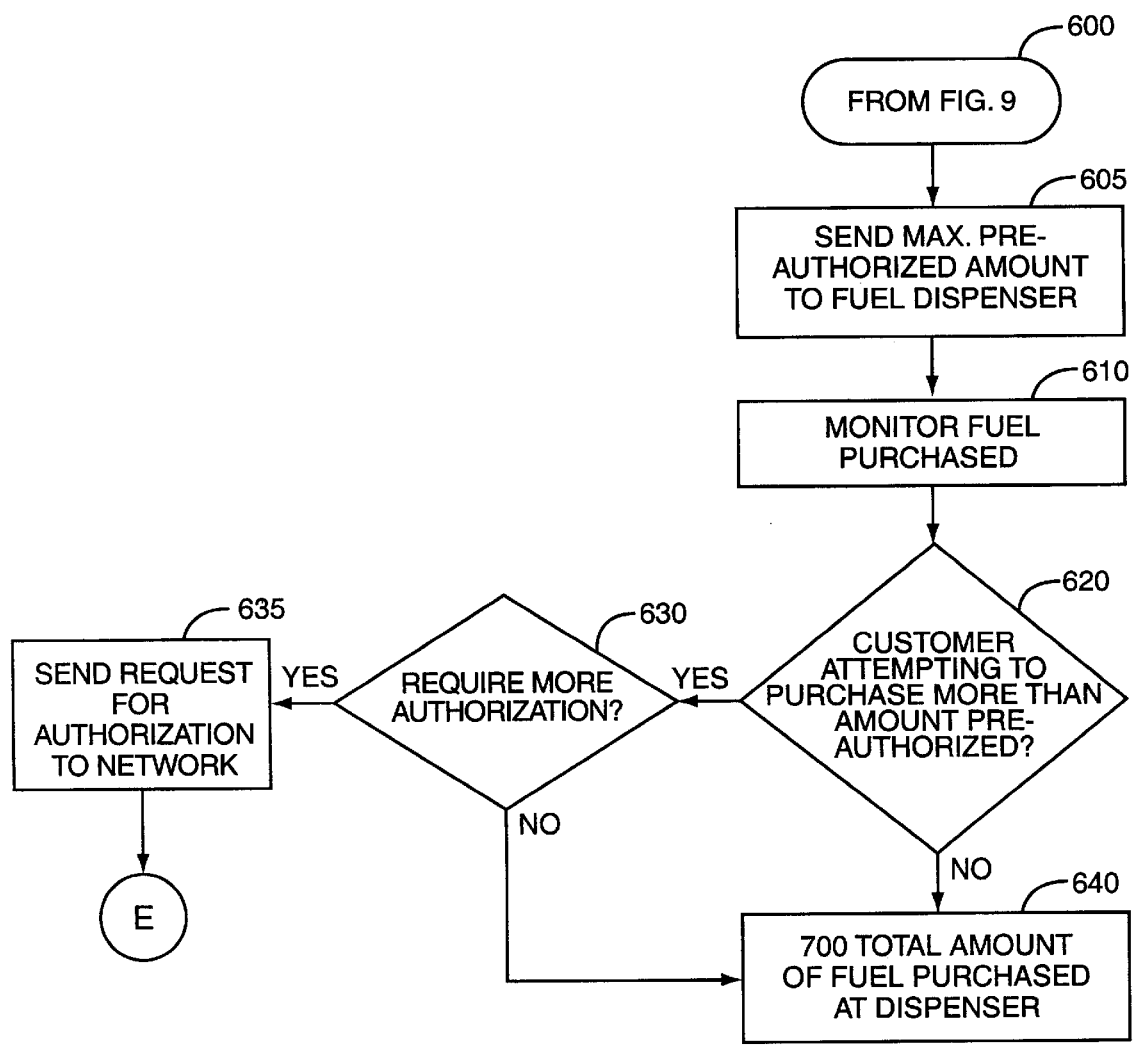
FIGS. 13A and 13B are a flow chart representing basic fuel delivery control.
Figure 13B:
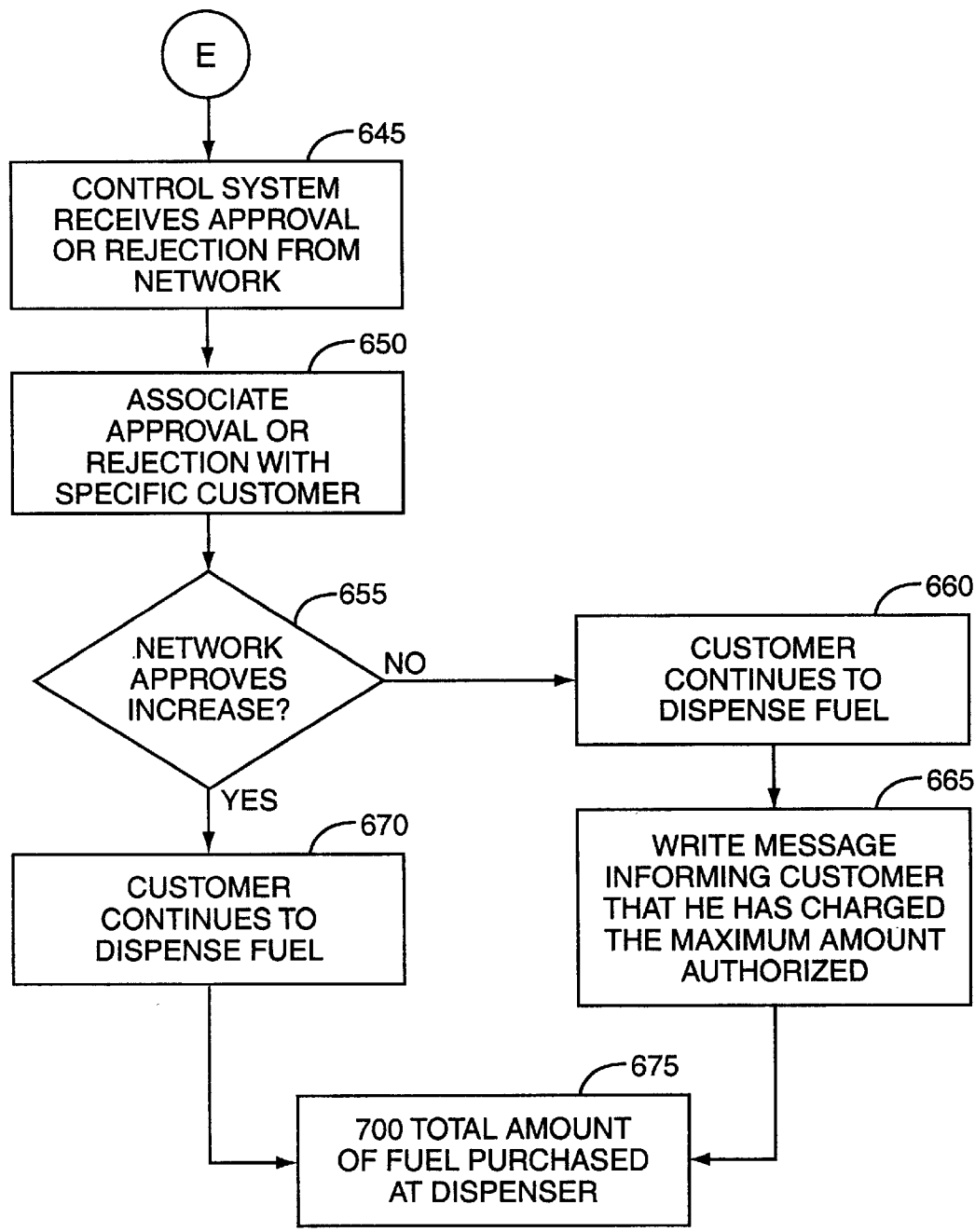
Figure 14A:
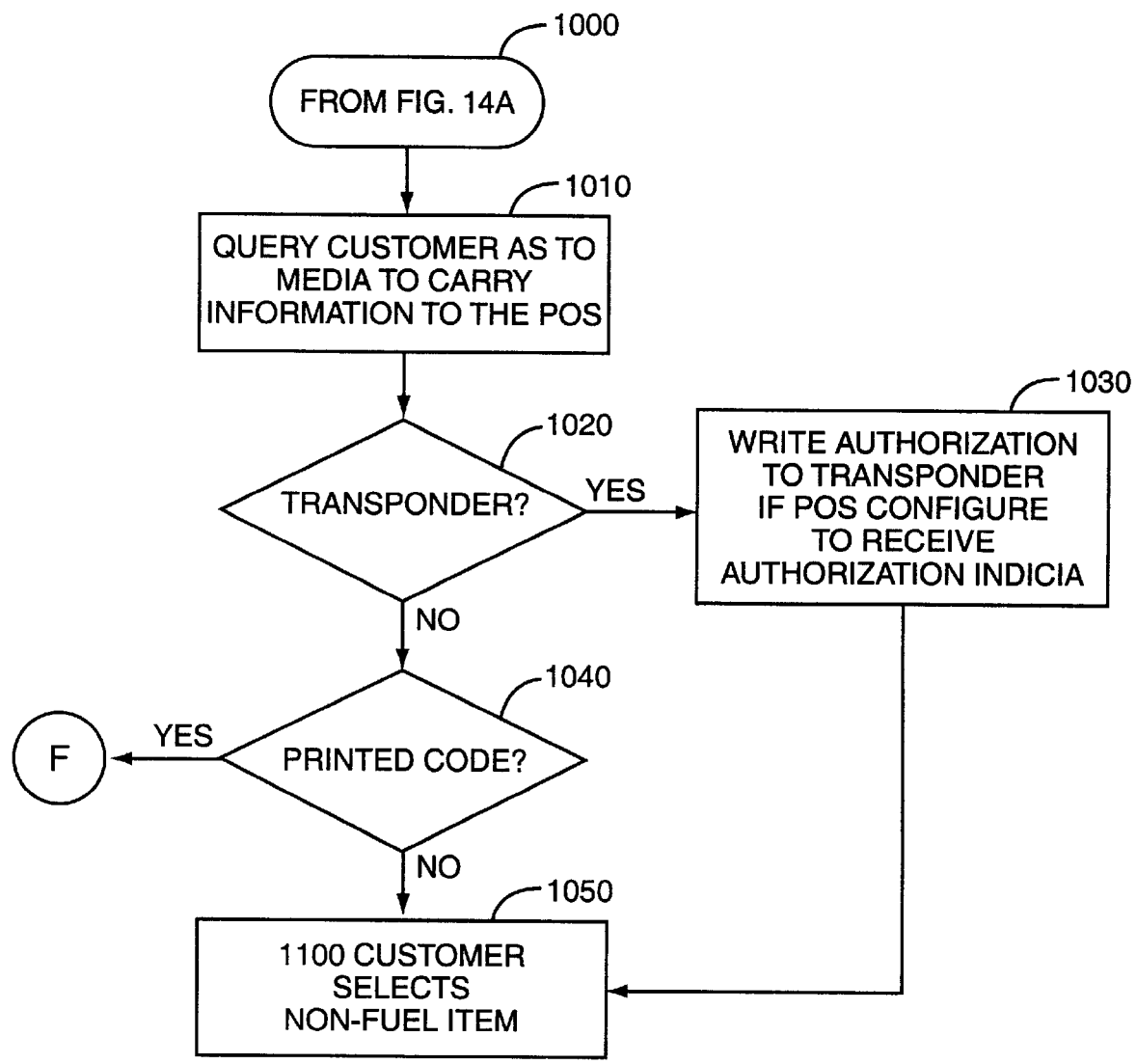
FIGS. 14A and 14B are a flow chart representing holding authorization open.
Figure 14B:
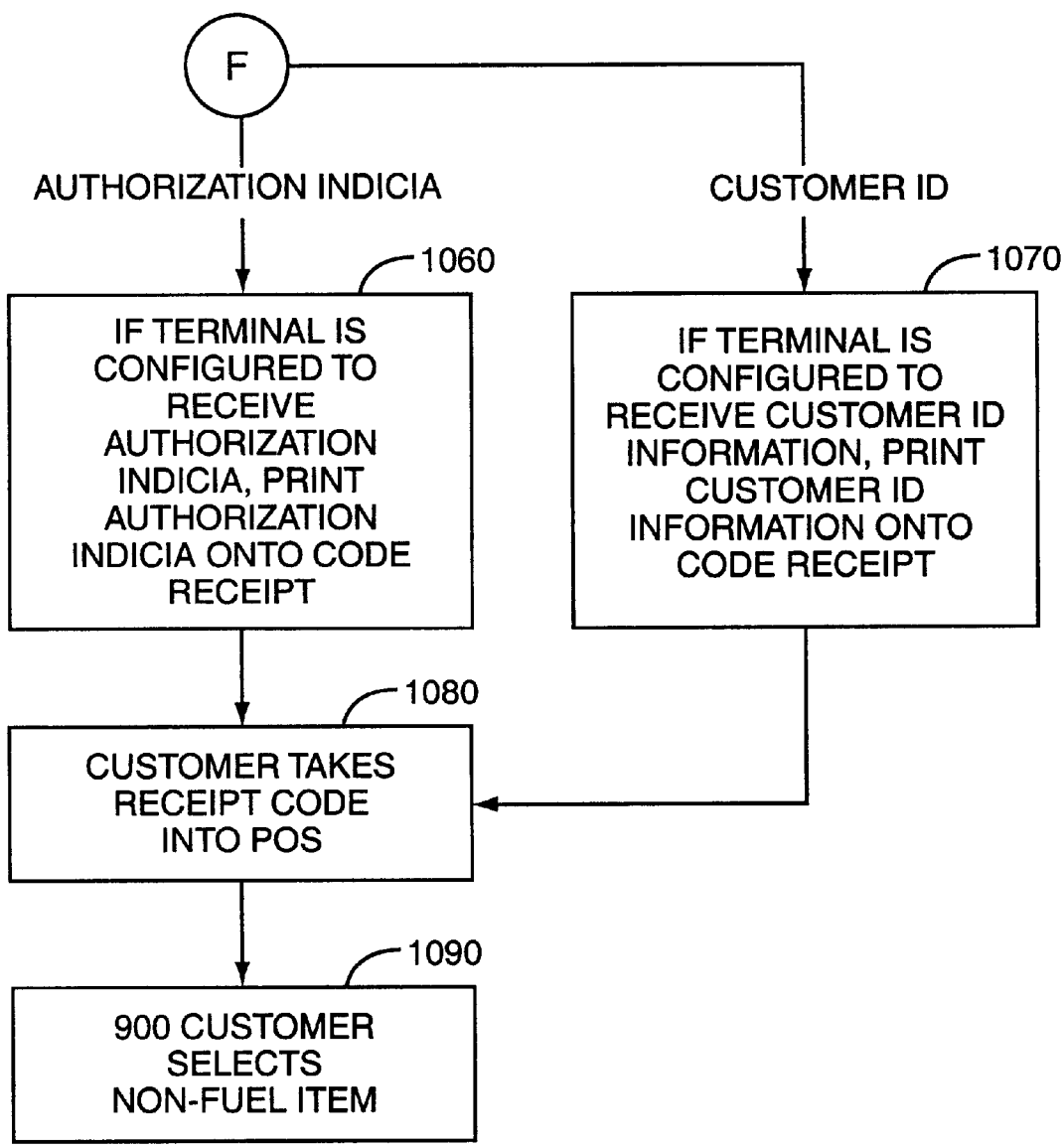

After the control system associates an authorization indicia with a specific customer, the control system allows the approved customer to dispense fuel (Block 600), as shown in FIGS. 13A and 13B. First, the central control system may send to the control system the maximum amount that a specific customer was pre-authorized to purchase (Block 605). Either the central control system or the dispenser control system then monitors the customer's fuel purchase (Block 610). If the customer does not attempt to purchase more than that for which she was pre-authorized (Block 620), the control system totals the amount of fuel purchased at the dispenser (Block 640).

If the customer attempts to purchase more than that for which she was pre-authorized (Block 620), the control system determines if further authorization is required before allowing the customer to continue her purchase (Block 630).

If further authorization is not required (Block 630), the control system totals the amount of fuel purchased at the dispenser (Block 640). If further authorization is required (Block 630), the control system sends a request for further authorization to the network (Block 635).

After requesting further authorization (Block 635), the control system receives the network approval or rejection (Block 645). The control system then associates this approval or rejection with the specific customer for whom the request for further authorization was requested (Block 650). If the network approved the increase in the pre-authorization amount (Block 655), the customer is allowed to continue to dispense fuel (Block 670). The control system then totals the amount of fuel purchased by the customer (Block 675).

If, however, the network rejects the request for an increase in the pre-authorized amount (Block 655), the control system turns off the fuel dispenser (Block 660) and informs the customer that she has purchased the maximum amount for which she was pre-authorized (Block 665). The control system then totals the amount of fuel purchased by the customer (Block 675).

After totaling the amount of fuel purchased by a specific customer at the dispenser (Block 700) (see FIGS. 9A and 9B), the control system queries the customer, asking her if she would like to purchase non-fuel items within the convenience store (Block 800). This query may also be made at the beginning of or any time during the transaction. For example, the customer may also be queried before the customer dispenses fuel (Block 600). If the customer does not want to purchase non-fuel items (Block 900), the control system calculates the customer's total purchase amount as the amount of fuel that the customer purchased (Block 1500).

If the customer does want to purchase non-fuel items (Block 900), the authorization is held "open" to allow the customer time to select her items within the convenience store (Block 1000). As detailed in FIGS. 14A and 14B, after determining that the customer wants to purchase non-fuel goods or services, the control system may query the customer as to the media the customer would like to use to carry the necessary identification information to the point-of-sale (POS) at the store or restaurant for the non-fuel items (Block 1010). If the customer does not answer this query, the default answer is preferably that the customer would like to use the same media she used to initiate the purchase of fuel at the dispenser. It is important that correlation of a subsequent purchase apart from the dispenser relies on information provided to the POS by the customer. The information may be permanently kept by the customer or provided to the customer via the dispenser.

If the customer would like to carry her personal transponder to the POS (Block 1020), the control system writes the authorization indicia to the programmable memory of the personal transponder via the dispenser interrogator if the POS is configured to receive authorization indicia (Block 1030). The customer is then allowed to select her non-fuel items (Block 1050). It is unnecessary for the control system to initiate any steps if the POS is configured to receive customer identification information, as such information is pre-programmed into the memory of the personal transponder kept by the customer, or stored on the card.

If the customer would like to receive a receipt with a printed code on it to the POS terminal (Block 1040) effect purchase, the dispenser prints the authorization indicia onto the customer receipt (Block 1060). The code may be a number or scanable indicia, such as a bar code readable a scanner at the POS. After the customer receipt is printed, the customer takes the receipt into the POS (Block 1080) with selected non-fuel items (Block 1090).

If the customer does not wish to use a personal transponder (Block 1020) or use a code printed onto her receipt (Block 1040), the customer may use her credit or debit card at the POS by simply entering the POS and selecting her non-fuel items (Block 1050). A credit card or debit card will already contain the sufficient information on its magnetic strip for authorization correlation.

Figure 15A:
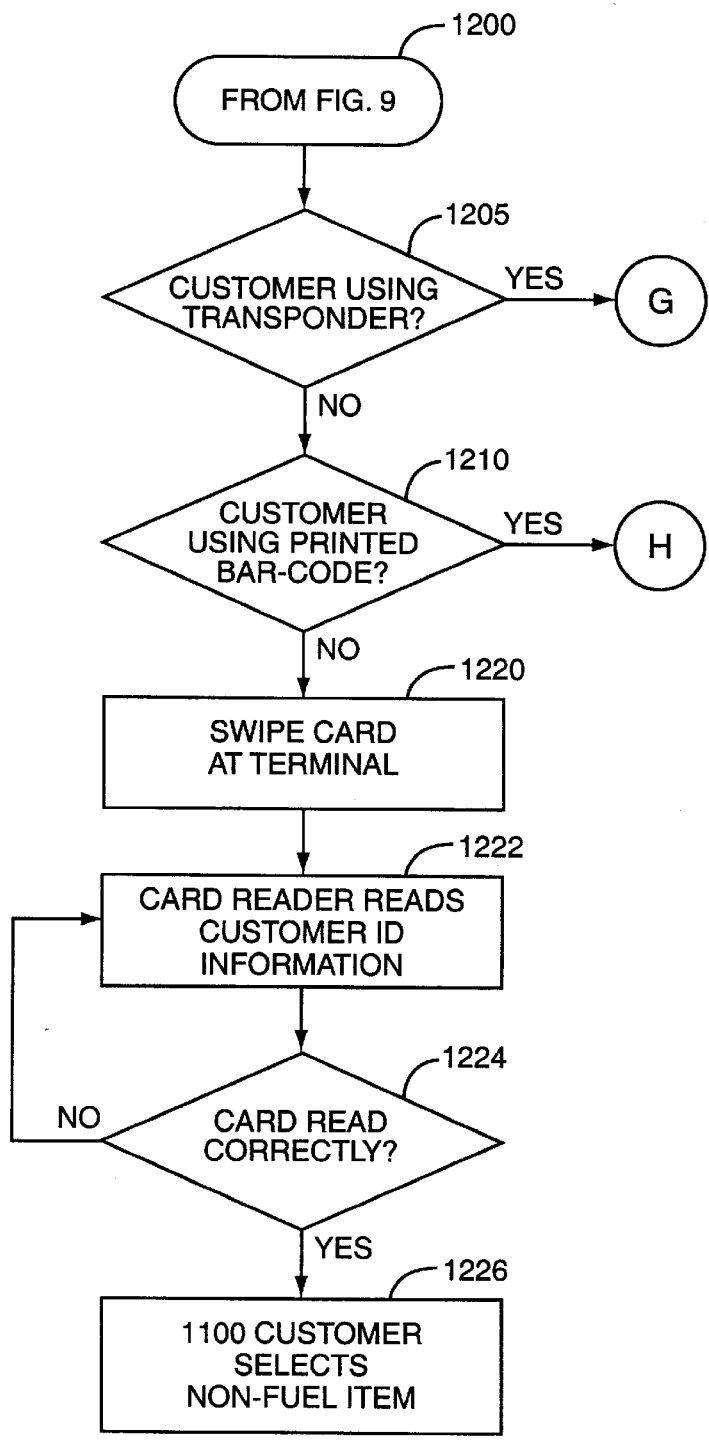
FIGS. 15A, 15B and 15C are a flow chart representing receiving customer information at the POS.
Figure 15B:
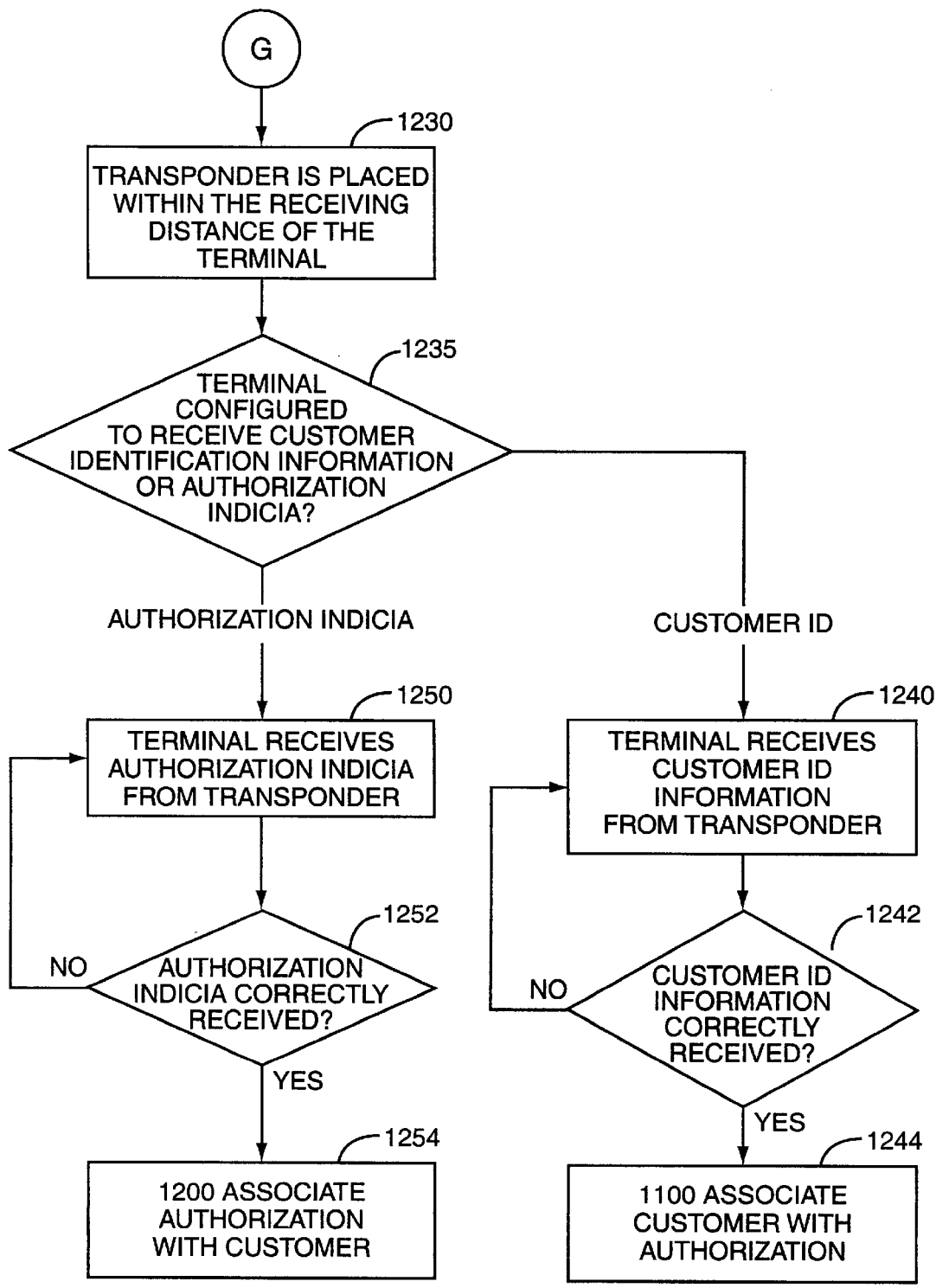
Figure 15C:
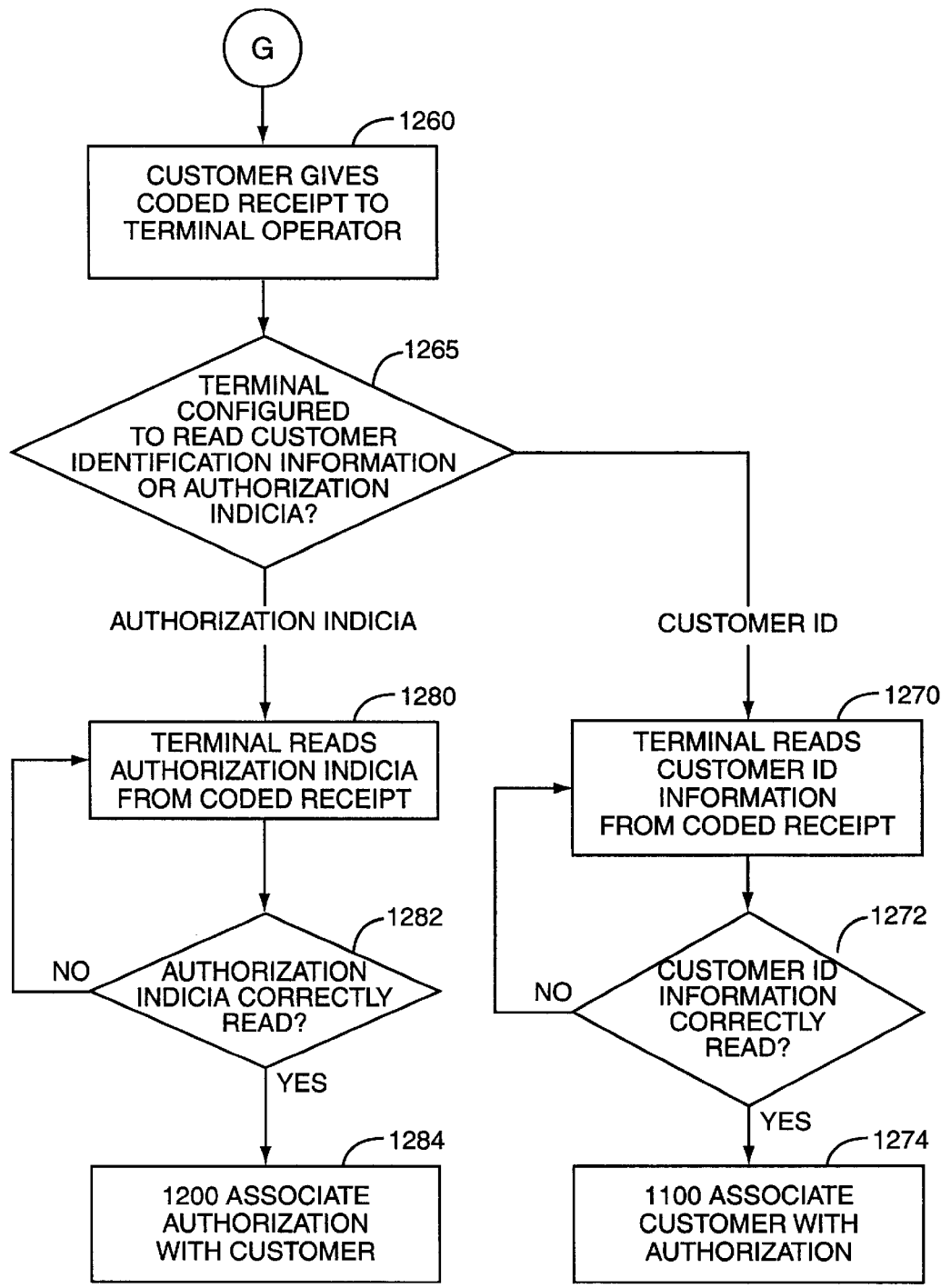

After the customer selects her non-fuel goods and services (Block 1100), the POS terminal receives identifying information from the customer (Block 1200), as detailed in FIGS. 15A, 15B and 15C. If the customer is not using a personal transponder (Block 1205) or a receipt with a printed code on it (Block 1210), the customer gives her debit or credit card to the POS terminal operator (Block 1220) or personally swipes card at terminal. The POS card reader reads the customer information from the magnetic strip on the card (Block 1222). When the data is correctly read (Block 1224) the control system associates the read customer information with the appropriate authorization indicia (Block 1226).

If the customer is using a personal transponder (Block 1205), the customer places her personal transponder within the receiving distance of the terminal (Block 1230). If the terminal is configured to receive customer information (Block 1235), the terminal receives customer information from the personal transponder (Block 1240). When the customer information is correctly received (Block 1242), the control system associates the given customer identification with the appropriate authorization (Block 1244).

Alternatively, if the POS terminal is configured to receive authorization indicia received at the dispenser (Block 1235), the terminal receives authorization indicia from the customer's personal transponder (Block 1250). When the authorization indicia is correctly received (Block 1252), the control system associates the given authorization indicia with the appropriate customer identification (Block 1254).

If the customer elects to use a coded receipt to identify herself at the POS (Block 1210), the customer gives the coded receipt to the POS terminal operator after selecting her non-fuel goods and services (Block 1260). If the POS terminal is configured to read customer information (Block 1265), the terminal reads the customer information from the coded receipt (Block 1270). When the customer information is correctly read from the coded receipt (Block 1272), the control system associates the given customer information with the appropriate authorization indicia (Block 1274). If the POS terminal is configured to receive authorization indicia (Block 1265), the POS terminal reads the authorization indicia from the coded receipt (Block 1280). When the authorization indicia is correctly read from the coded receipt (Block 1282), the control system associates the given authorization indicia with the appropriate customer identification (Block 1284).

If the terminal is configured to receive authorization indicia provided to the customer at the dispenser, the control system associates the given authorization indicia with the appropriate customer, dispenser purchases and/or dispenser purchases (Block 1300) after the authorization indicia is received at the POS terminal counter (Block 1200), as shown in FIG. 9B. The control system then totals the customer's purchase by summing the non-fuel and fuel purchases together to determine the customer's overall purchase amount (Block 1500).

If the terminal is configured to receive customer identification information, the control system associates the given customer identification information with the appropriate authorization indicia (Block 1400) after the authorization indicia is received at the POS terminal counter. To associate the customer identification information with the appropriate authorization indicia, the dispenser purchases, and/or non-dispenser purchases will correlate the returned authorization number with the customer identification information (Block 1320). The control system then totals the customer's purchase (Block 1430) by summing the non-fuel and fuel purchases together to determine the customer's overall purchase amount (Block 1500).

Figure 16A:
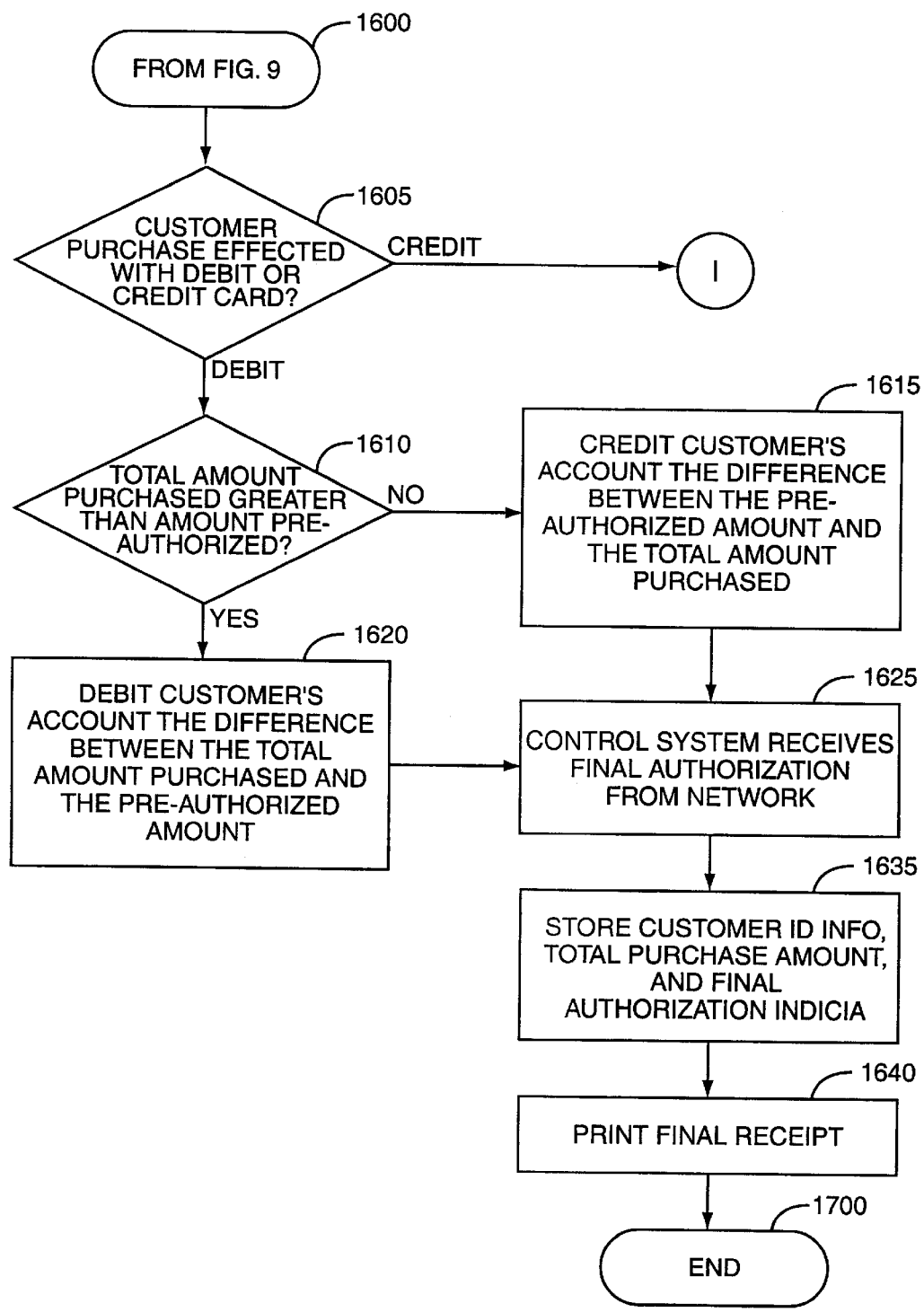
FIGS. 16A and 16B are a flow chart representing accounting for a debit or credit purchase.
Figure 16B:
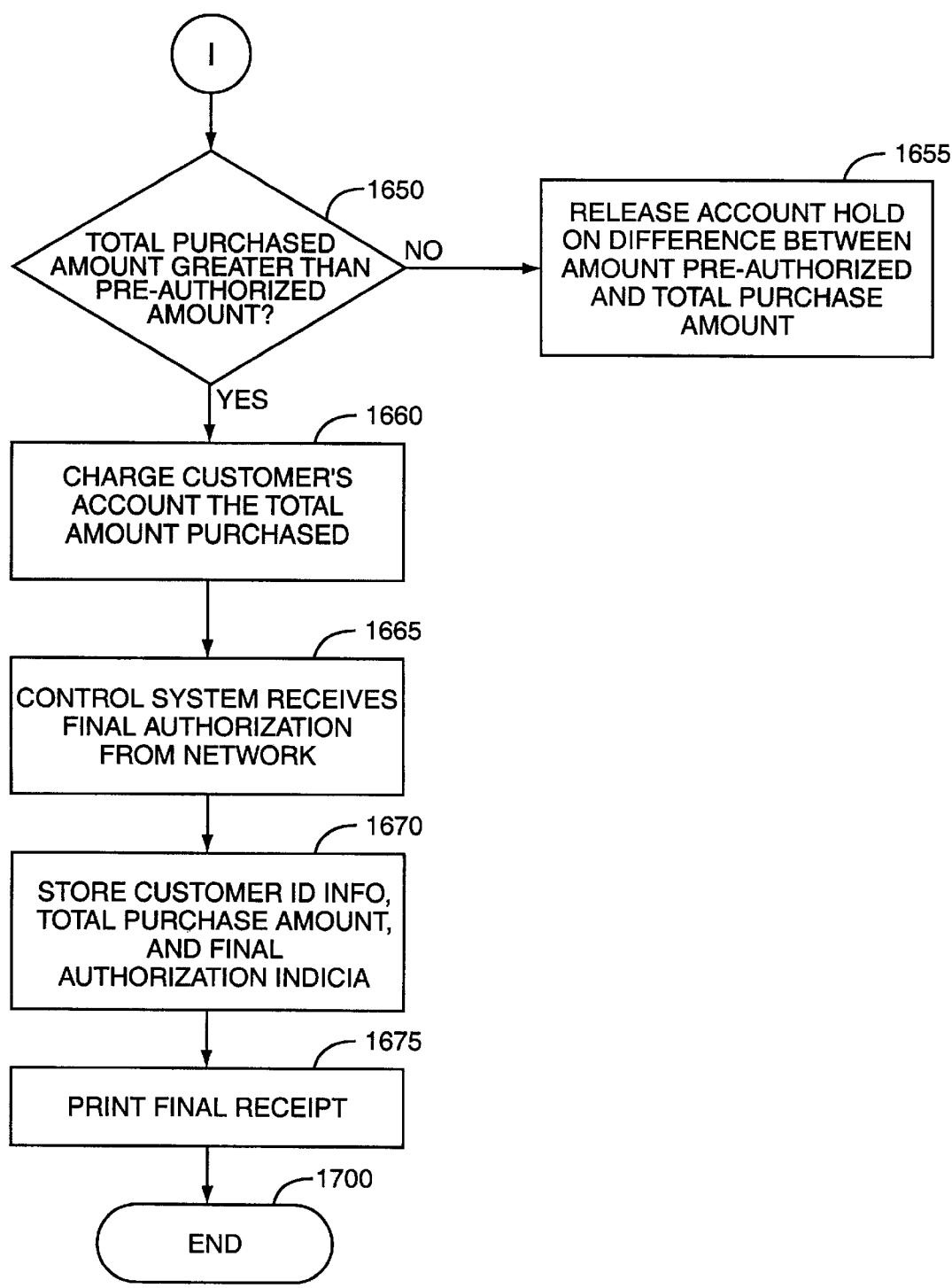

After summing the non-fuel and fuel purchases together (Block 1500), the control system then accounts for the purchase for a given authorization (Block 1600) as detailed in FIGS. 16A and 16B. To account for the purchase (Block 1600), the control system first determines whether the customer used a debit card or a credit card (Block 1605). If the control system determines that the customer used a debit card (Block 1605) and that the total amount purchased was greater than the amount pre-authorized and debited by the network (Block 1610), the control system requests the network to debit the customer's account the additional difference between the total amount purchased and the pre-authorized amount (Block 1620). The control system then receives the final authorization number, associated with the completed transaction, from the network (Block 1625).

If the control system determines that the customer used a debit card (Block 1605) and that the total amount purchased was less than the amount pre-authorized by the network (Block 1610), the control system requests the network to credit the customer's account the difference between the pre-authorized amount previously debited from the customer's account and the total amount actually purchased (Block 1615). The control system then receives the final authorization number, associated with the completed transaction, from the network (Block 1625).

To ensure accurate record-keeping, the control system preferably stores the customer identification information, the total purchase amount, and the final authorization number into memory (Block 1635). Finally, the control system may print a final receipt summarizing the purchases if desired (Block 1640). The transaction is thus concluded (Block 1700).

If the control system determines that the customer used a credit card (Block 1605) and that the total amount purchased was less than the amount pre-authorized by the network (Block 1650), the control system requests the network to release the hold on the customer's account for the difference between the pre-authorized amount previously held from the customer's account and the total amount actually purchased (Block 1655). The control system then requests the network to charge the total amount purchased to the customer's account (Block 1660). If the customer used a credit card and purchased an amount greater than that for which the customer was pre-authorized, the hold on the customer's account is not released. Instead the control system simply requests that the network charge the customer's account the total amount purchased (Block 1660). The control system then receives the final authorization number, associated with the completed transaction, from the network (Block 1665).

To ensure accurate record-keeping, the control system preferably stores the customer identification information, the total purchase amount, and the final authorization number into memory (Block 1670). Finally, the control system prints a final receipt summarizing the transaction purchase amount and the final authorization indicia (Block 1675). The transaction is thus concluded (Block 1700).

Those of ordinary skill in the art will appreciate that the invention can be carried out in other forms differing from as specifically outlined herein yet still fall within the scope of the invention, and the claims are to be read as covering such embodiments.

What is claimed is:

1. A fuel transaction system for enabling the purchase of fuel and non-fuel items at different locations from a single authorization, comprising:
   a. a dispenser adapted to receive information from a customer, and
   b. a remote terminal located apart from said dispenser and adapted to receive information from the customer, and
   c. a control system operatively associated with said dispenser and said terminal and adapted to:
      (i) obtain authorization to make a purchase on an account associated with the customer based on information received at the dispenser;
      (ii) determine an amount of fuel delivered by said dispenser;
      (iii) associate items to be purchased at the remote terminal with said authorization based on information received at said remote terminal from the customer; and
      (iv) account for fuel delivered by said dispenser and the items to be purchased at said remote terminal relative to said authorization and the account associated with the customer,
      (v) wherein the customer may provide sufficient information to obtain authorization for a purchase at said dispenser and effect purchase of goods or services a the remote terminal on the same authorization obtained via said dispenser.

2. The transaction system of claim 1 wherein the information received from the customer at the fuel dispenser and remote terminal is possessed by the customer prior to any transaction.

3. The transaction system of claim 2 wherein said dispenser further includes a card reader associated with said control system and adapted to read the information received at the fuel dispenser from a card via said card reader.

4. The transaction system of claim 2 wherein said dispenser further includes communication electronics associated with said control system and adapted to communicate with a remote communication device associated with the customer, said communication electronics adapted to read the information received at the fuel dispenser from a remote communication device via said communication electronics.

5. The transaction system of claim 2 wherein said dispenser further includes an input device associated with said control system and adapted to receive the information received at the fuel dispenser from customer input.

6. The transaction system of claim 5 wherein said input device is a touch or key pad.

7. The transaction system of claim 2 wherein said dispenser further includes a biometric reader associated with said control system and adapted to read biometric the information received at the fuel dispenser from a customer's person via said biometric reader.

8. The transaction system of claim 2 wherein said dispenser further includes a biometric reader associated with said control system and adapted to read biometric the information received at the fuel dispenser from a customer's person via said biometric reader.

9. The transaction system of claim 1 wherein the information received at the dispenser is the same as the information received at the remote terminal.

10. The transaction system of claim 9 wherein said control system further includes a central controller communicably linked said dispenser and terminal controllers.

11. The transaction system of claim 1 wherein the information received at the dispenser is held by the customer and used to obtain authorization to make a purchase, and the information to be received at the terminal is provided to the customer at the dispenser for presentment at the remote terminal.

12. The transaction system of claim 1 wherein the information received at the dispenser and the information received at the remote terminal are related.

13. The transaction system of claim 1 wherein said dispenser is further adapted to provide authorization information associated with the obtained authorization to the customer; the information received from the customer at the fuel dispenser is used to obtain the authorization to make a purchase on an account associated with the customer; and the information received from the customer at the point of sale terminal is or includes the authorization information provided to the customer at the dispenser.

14. The transaction system of claim 13 wherein said dispenser includes a card reader associated with said control system and adapted to write the authorization indicia to a card, and said terminal further includes a card reader associated with said control system and adapted to read the authorization information written to a card at the dispenser via said card reader at the terminal.

15. The transaction system of claim 13 wherein said dispenser includes communication electronics associated with said control system and adapted to write the authorization indicia to a remote communication device associated with the customer, and said terminal includes communication electronics associated with said control system and adapted to read the authorization information written to a remote communications device at the dispenser via said communication electronics at the terminal.

16. The transaction system of claim 13 wherein said dispenser includes an output device associated with said control system and adapted to provide the authorization indicia to the customer, and said terminal further includes an input device associated with said control system and adapted to receive the authorization information, which was provided to the customer at the dispenser.

17. The transaction system of claim 16 wherein said output device is a printer adapted to provide print indicia including the authorization information.

18. The transaction system of claim 17 wherein said input device is a scanner adapted to read the print indicia.

19. The transaction system of claim 18 wherein said printer and control system cooperate to print the print indicia as a scannable code and said input device and said control system cooperate to read said scannable code.

20. The transaction system of claim 19 wherein said scannable code is a bar code.

21. The transaction system of claim 16 wherein said input device is a keyboard for entering the authorization information, which was provided to the customer at the dispenser.

22. The transaction system of claim 1 wherein said control system includes communicably linked controllers in said dispenser and said terminal.

23. The transaction system of claim 1 wherein said terminal is associated with a restaurant point of sale.

24. The transaction system of claim 1 wherein said terminal is associated with a convenience store point of sale.

25. The transaction system of claim 1 wherein said terminal is associated with a vending machine.

26. The transaction system of claim 1 wherein said control system is configured to obtain the authorization based on identification information from the customer.

27. The transaction system of claim 1 wherein said control system is configured to obtain the authorization based on financial information from the customer.

28. The transaction system of claim 1 wherein said control system is configured to contact a host authorization network to obtain authorization for a given account.

29. The transaction system of claim 1 wherein said control system is configured to provide a receipt accounting for fuel delivered at the dispenser and items purchased at the remote terminal.

30. The transaction system of claim 1 wherein the information received from the customer at the fuel dispenser and remote terminal is possessed by the customer prior to any transaction.

31. The transaction system of claim 1 further comprising means for providing authorization information associated with the obtained authorization to the customer while at the dispenser wherein the information received from the customer at the fuel dispenser is used to obtain the authorization to make a purchase on an account associated with the customer; and the information received from the customer at the point of sale terminal is or includes the authorization information provided to the customer at the dispenser.

32. A fuel transaction system for enabling the purchase of fuel and non-fuel items at different locations from a single authorization, said system comprising:

a. a dispenser associated with means for receiving information from a customer near the dispenser;

b. a remote terminal located apart from said dispenser and associated with means for receiving information from the customer near the terminal; and c. means for obtaining authorization to make a purchase on an account associated with the customer based on information received at the dispenser;

d. means for determining an amount of fuel delivered by said dispenser;

e. means for associating items to be purchased at the remote terminal with authorization based on information received at said remote terminal from the customer; and f. means for accounting for fuel delivered by said dispenser and the items to be purchased at said remote terminal relative to said authorization and the account associated with the customer, wherein the customer may provide sufficient information to obtain authorization for a purchase at said dispenser and effect purchase of goods or services at the remote terminal on the same authorization obtained via said dispenser.

33. A method for enabling the purchase of fuel and non-fuel items at different locations from a single authorization, the method comprising:

a. receiving information from a customer via a dispenser;

b. obtaining authorization to make a purchase on an account associated with the customer based information received at the dispenser;

c. determining an amount of fuel delivered by the dispenser;

d. associating items to be purchased at a remote terminal with the authorization based on information received at the remote terminal from the customer; and e. accounting for fuel delivered by the dispenser and the items to be purchased at the remote terminal relative to the authorization and the account associated with the customer;

f. wherein the customer may provide sufficient information to obtain authorization for a purchase at the dispenser and effect purchase of goods or services at the remote terminal on the same authorization obtained via the dispenser.

34. A fuel transaction system for enabling the purchase of fuel and non-fuel items at different locations from a single authorization, comprising:

a. a dispenser adapted to receive information provided by a customer; and b. a remote terminal located apart from said dispenser and adapted to receive information from the customer;

c. a control system operatively associated with said dispenser and terminal, and adapted to:
   i. obtain authorization for a customer's account based on information received at the dispenser;
   ii. total amount of fuel delivered at the dispenser;
   iii. associate items selected at a remote location for purchase by the customer with said authorization based on information received at the terminal;
   iv. total amount of items selected at the terminal and the amount of fuel purchased at the dispenser; and
   v. account for the purchase of fuel and selected items with said authorization.

35. A fuel transaction system as claimed in claim 34 wherein said information received at the dispenser and the remote terminal includes identification indicia, said associated authorization at the terminal being based on the received identification indicia.

36. A fuel transaction system as claimed in claim 35 wherein said identification received at the dispenser and the remote terminal is carried on a transponder and is received by an interrogator.

37. A fuel transaction system as claimed in claim 35 wherein said identification received at the dispenser and the remote terminal is carried on a card and is read by a card reader.

38. A fuel transaction system as claimed in claim 35 wherein said identification received at the dispenser and the remote terminal is entered into a keypad.

39. A fuel transaction system as claimed in claim 34 wherein the dispenser provides authorization indicia to the customer and said information received at the remote terminal includes said authorization indicia provided to the customer, said associated authorization at the remote terminal being based on the authorization indicia provided to the customer.

40. A fuel transaction system as claimed in claim 39 wherein the authorization indicia provided to the customer is stored in a transponder and is received by an interrogator at the remote terminal.

41. A fuel transaction system as claimed in claim 39 wherein the authorization indicia provided to the customer is printed on a receipt and received at the remote terminal.

42. A fuel transaction system as claimed in claim 39 wherein the authorization indicia provided to the customer is stored on a card and is read by a card reader at the remote terminal.

43. A fuel transaction system as claimed in claim 39 wherein the authorization indicia provided to the customer is displayed at the dispenser and at the remote terminal.

44. A fuel transaction system as claimed in claim 39 wherein the authorization indicia is scannable indicia and is read by a scanner at the remote terminal.

45. A fuel transaction system as claimed in claim 44 wherein the scannable indicia is a code and the scanner at the remote terminal is a code reader.

46. A fuel transaction system as claimed in claim 45 wherein the code is a bar-code and the code reader is a bar-code reader.

47. A fuel transaction system as claimed in claim 34 wherein said remote terminal is one of the group consisting of a vending machine interface, a quick-service restaurant, or a point-of-sale in the associated store.

48. A fuel transaction system as claimed in claim 34 wherein the customer is provided with incentives to increase customer loyalty.

49. A fuel transaction system as claimed in claim 48 wherein said incentives include discounts for non-fuel purchases made on the same authorization obtained at the dispenser and made within the associated store or restaurant.

50. A fuel transaction system as claimed in claim 48 wherein said incentives include loyalty points awarded on the basis of prior fuel and non-fuel purchases and are redeemable within the associated store or restaurant.

51. A fuel transaction system for enabling the purchase of fuel and non-fuel items at different locations from a single authorization, comprising:

a. a dispenser having means for receiving information from a customer;

b. a remote terminal located apart from said dispenser and having means for receiving information from the customer;

c. means for obtaining authorization to make a purchase on an account associated with the customer based on information received at the dispenser;

d. means for determining an amount of fuel delivered by said dispenser;

e. means for associating items to be purchased at the remote terminal with said authorization based on information received at said remote terminal from the customer; and f. means for accounting for fuel delivered by said dispenser and the items to be purchased at said remote terminal relative to said authorization and the account associated with the customer;

g. wherein the customer may provide sufficient information to obtain authorization for a purchase at said dispenser and effect purchase of goods or services at the remote terminal on provide sufficient information to obtain authorization for a purchase at said dispenser and effect purchase of goods or services at the remote terminal on the same authorization obtained via said dispenser.

* * * * *